(12) United States Patent
Mori et al.

(10) Patent No.: US 12,180,406 B2
(45) Date of Patent: Dec. 31, 2024

(54) REPAIRING MATERIAL FOR LIQUID LEAKAGE, REPAIRING METHOD FOR LIQUID LEAKAGE, AND PIPELINE

(71) Applicant: Dexerials Corporation, Tokyo (JP)

(72) Inventors: Yasutaka Mori, Tokyo (JP); Takaaki Kubota, Tokyo (JP); Tetsuya Abe, Tokyo (JP)

(73) Assignee: Dexerials Corporation, Tokyo (JP)

( * ) Notice: Subject to any disclaimer, the term of this patent is extended or adjusted under 35 U.S.C. 154(b) by 952 days.

(21) Appl. No.: 17/279,645

(22) PCT Filed: Aug. 23, 2019

(86) PCT No.: PCT/JP2019/033146
§ 371 (c)(1),
(2) Date: Mar. 25, 2021

(87) PCT Pub. No.: WO2020/066403
PCT Pub. Date: Apr. 2, 2020

(65) Prior Publication Data
US 2021/0388248 A1   Dec. 16, 2021

(30) Foreign Application Priority Data

Sep. 27, 2018   (JP) ................................. 2018-181734

(51) Int. Cl.
*C09K 3/12*   (2006.01)
*C08F 2/50*   (2006.01)
(Continued)

(52) U.S. Cl.
CPC .................. *C09K 3/12* (2013.01); *C08F 2/50* (2013.01); *C08F 220/1811* (2020.02);
(Continued)

(58) Field of Classification Search
CPC .. C09K 3/12; C08F 220/1818; C08F 222/102; C08F 220/1811; C08F 2/50;
(Continued)

(56) References Cited

U.S. PATENT DOCUMENTS

| | | |
|---|---|---|
| 2013/0309040 A1 | 11/2013 | Phillips |
| 2016/0280972 A1 | 9/2016 | Bandyopadhyay |
| 2019/0144660 A1 | 5/2019 | Takeuchi et al. |

FOREIGN PATENT DOCUMENTS

| | | |
|---|---|---|
| DE | 19745981 B4 | 9/2012 |
| EP | 0393407 B1 | 6/1994 |

(Continued)

OTHER PUBLICATIONS

Office Action issued Mar. 21, 2023, by the Korean Intellectual Property Office in corresponding Korean Patent Application No. 10-2021-7008067 with an English translation of Office Action (8 pages).

(Continued)

*Primary Examiner* — Ling Siu Choi
*Assistant Examiner* — Ronald Grinsted
(74) *Attorney, Agent, or Firm* — IPUSA, PLLC

(57) ABSTRACT

A liquid leakage repair material includes: an inorganic filler in an amount of 20% by mass or greater but 95% by mass or less; and a curable composition that includes a monofunctional (meth) acrylate; a multifunctional (meth) acrylate; and a radical initiator. The target liquid to be prevented from leakage by the liquid leakage repair material is an oil. An oil absorption rate of the liquid leakage repair material after being cured is lower than 10%.

8 Claims, 17 Drawing Sheets

(51) Int. Cl.
  *C08F 220/18* (2006.01)
  *C08F 220/20* (2006.01)
  *C08F 222/10* (2006.01)
  *F16L 55/168* (2006.01)
  *C08K 3/36* (2006.01)
  *C08K 5/07* (2006.01)

(52) U.S. Cl.
  CPC ...... *C08F 220/1818* (2020.02); *C08F 220/20* (2013.01); *C08F 222/102* (2020.02); *F16L 55/1683* (2013.01); *C08K 3/36* (2013.01); *C08K 5/07* (2013.01)

(58) Field of Classification Search
  CPC ...... C08F 220/20; F16L 55/1683; C08K 3/36; C08K 5/07
  USPC ........................................................ 524/854
  See application file for complete search history.

(56) References Cited

FOREIGN PATENT DOCUMENTS

| | | | |
|---|---|---|---|
| JP | 59-172529 A | | 9/1984 |
| JP | 59172579 A | * | 9/1984 |
| JP | S59172579 A | | 9/1984 |
| JP | 2001338814 A | | 12/2001 |
| JP | 2003306662 A | | 10/2003 |
| JP | 2006-064166 A | | 3/2006 |
| JP | 2008230643 A | | 10/2008 |
| JP | 2009292972 A | | 12/2009 |
| JP | 2012211652 A | | 11/2012 |
| JP | 2016520675 A | | 7/2016 |
| KR | 10-1761552 B1 | | 8/2017 |
| RU | 2327723 C1 | | 6/2008 |
| TW | 201418432 A | * | 5/2014 |
| WO | 2017/195304 A1 | | 11/2017 |

OTHER PUBLICATIONS

Extended European Search Report issued May 23, 2022, by the European Patent Office in corresponding European Patent Application No. 19864936.0. (9 pages).

International Search Report (PCT/ISA/210) with an English translation thereof, and Written Opinion (PCT/ISA/237) mailed on Oct. 21, 2019, by the Japanese Patent Office as the International Searching Authority for International Application No. PCT/JP2019/033146. (16 pages).

Office Action mailed on Mar. 26, 2019, by the Japanese Patent Office for corresponding Japanese Application No. 2018-181734. (8 pages).

Office Action issued on Sep. 23, 2021, by the Federal Service for Intellectual Property in correponding Russian Patent Application No. 2021111405/04(024382) and an English translation of the Office Action. (25 pages).

Office Action issued on Mar. 8, 2023, by the Taiwan Intellectual Property Office in corresponding Taiwanese Patent Application No. 108131049 and an English translation of the Office Action. (18 pages).

* cited by examiner

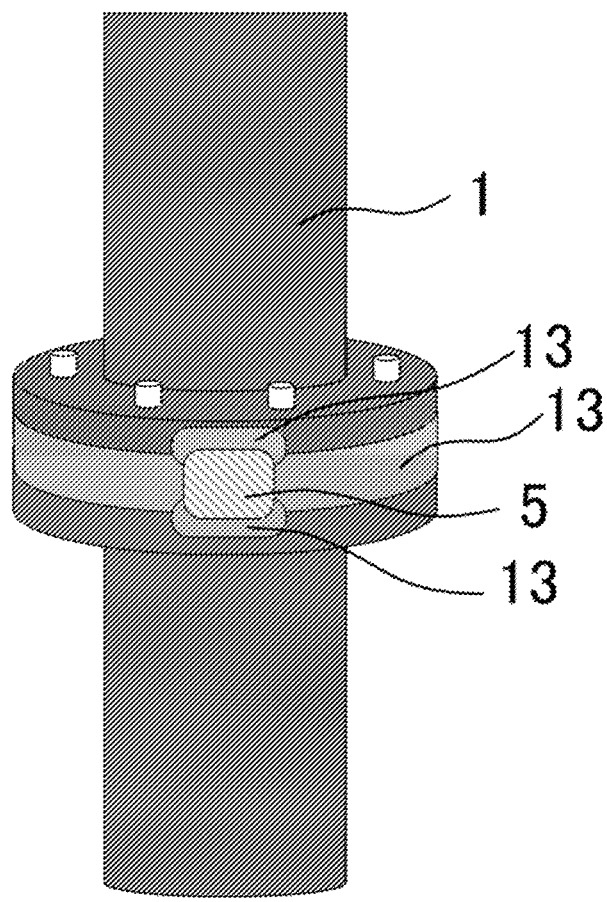

REPAIRING MATERIAL FOR LIQUID LEAKAGE, REPAIRING METHOD FOR LIQUID LEAKAGE, AND PIPELINE

TECHNICAL FIELD

The present invention relates to a liquid leakage repair material suitable for repairing a duct when a liquid leaks from a duct through which a liquid is circulated, a liquid leakage repairing method using the liquid leakage repair material and a duct repaired with the liquid leakage repair material.

The present invention also relates to a liquid leakage repairing method suitable for repairing a duct when a liquid leaks from a duct through which a liquid is circulated.

BACKGROUND ART

For example, a transformer equipped with a radiator is installed in, for example, a power plant or a transformer substation. The main body of the transformer and the radiator are coupled to each other through an oil pipeline, and an oil (e.g., an insulating oil) cooled with the radiator is circulated between the main body of the transformer and the radiator, to thereby cool the main body of the transformer.

As a result of a long-year use of an oil pipeline, there may be a case where an oil leaks from the flange portion of the oil pipeline. Further, as a result of a long-year use of an oil pipeline, there may be a case where a hole such as a pinhole opens in the oil pipeline and an oil leaks from the hole.

When oil leakage occurs, the oil may permeate the ground and constitute an indirect factor for pollution of the soil or the water quality. Particularly, insulating oils for old-type oil coolers may contain polybiphenyl chloride, which is an environmental hormone, and strict countermeasures are needed for leakage of oils in consideration of influences to the living things and the environment.

Hence, in order to prevent oil outspill when an oil leaks from a flange portion, a proposed transformer oil outspill preventing cover includes an oil-resistant covering body for covering the outer circumference of a coupling flange, and a cooling oil collecting container coupled to a cooling oil outlet opened at the lower end of the covering body (for example, see PTL 1).

However, this method cannot prevent outspill when an oil leaks from a portion other than the flange portion. Moreover, this method needs installation of, for example, the covering body and the collecting container, and lacks convenience.

As a convenient outspill preventing method for when an oil leaks from a portion other than the flange portion, the oil-leaked portion may be blocked with a waste cloth (a piece of cloth).

However, this method is no more than an emergency measure. When the waste cloth is fully soaked with the oil, it can no longer prevent additional oil leakage and lacks reliability as a measure for preventing outspill.

A proposed gas/liquid leakage preventing method that enables leakage repair without evacuation of a gas or liquid from inside, for example, a metallic tank includes a step of attaching a seal material at a gas-leaked portion or a liquid-leaked portion, a step of attaching a putty material on the seal material, and a step of pasting a glass fiber-reinforced plastic (FRP) on the seal material and the putty material (for example, see PTL 2).

However, this method needs at least three materials including the seal material, the putty material, and the glass fiber-reinforced plastic, and includes many steps. Therefore, this method lacks convenience.

Hence, currently, a method that can block liquid leakage easily and highly reliably when a liquid leaks from a duct through which a liquid is circulated is demanded.

CITATION LIST

Patent Literature

PTL 1: Japanese Patent Application Laid-Open (JP-A) No. 2001-338814
PTL 2: JP-A No. 2008-230643

SUMMARY OF INVENTION

Technical Problem

The present invention has an object to provide a liquid leakage repair material that can block liquid leakage easily and highly reliably when a liquid leaks from a duct though which a liquid is circulated, a liquid leakage repairing method using the liquid leakage repair material, a duct repaired with the liquid leakage repair material, and a liquid leakage repairing method that can block liquid leakage easily and highly reliably when a liquid leaks from a duct through which a liquid is circulated.

Solution to Problem

Means for solving the above problems are as follows.
<1> A liquid leakage repair material, including:
  a curable composition,
  wherein a liquid absorption rate of the liquid leakage repair material after cured is lower than 10%.
<2> The liquid leakage repair material according to <1>,
  wherein the liquid leakage repair material is free of stringiness.
<3> The liquid leakage repair material according to <1> or <2>,
  wherein a viscosity of the liquid leakage repair material is 0.1 Pa·s or higher but 100,000 Pa·s or lower.
<4> The liquid leakage repair material according to any one of <1> to <3>, further including:
  a filler.
<5> The liquid leakage repair material according to <4>,
  wherein the filler is an inorganic filler, and
  wherein the liquid leakage repair material contains the inorganic filler in an amount of 20% by mass or greater but 95% by mass or less.
<6> The liquid leakage repair material according to any one of <1> to <5>, further including:
  a monofunctional (meth)acrylate represented by formula (1) below;
  a multifunctional (meth)acrylate; and
  a radical initiator, General formula (1)

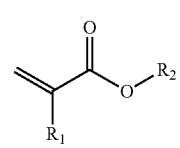

where in General formula (1), $R_1$ represents a hydrogen atom or a methyl group, and $R_2$ represents an organic group containing four or more carbon atoms.

<7> The liquid leakage repair material according to any one of <1> to <6>,
wherein the curable composition is an active-energy-ray-curable composition.

<8> The liquid leakage repair material according to any one of <1> to <7>,
wherein the liquid leakage repair material has a shear adhesive strength of 0.15 MPa or greater.

<9> The liquid leakage repair material according to any one of <1> to <8>,
wherein when the liquid leakage repair material is cured, a time taken until a storage modulus G' of the liquid leakage repair material reaches 0.07 MPa is 0.50 minutes or shorter.

<10> A liquid leakage repairing method, including:
a step of applying the liquid leakage repair material according to any one of <1> to <9>, which is an active-energy-ray-curable composition, over a liquid-leaked portion of a duct, and irradiating the liquid leakage repair material with active energy rays to cure the liquid leakage repair material.

<11> A duct including a liquid-leaked portion, the duct including:
a cured product of the liquid leakage repair material according to any one of <1> to <9> over the liquid-leaked portion.

<12> A liquid leakage repairing method, including:
a step of disposing a first liquid leakage repair material, which is a curable composition, around a liquid-leaked portion of a duct and curing the first liquid leakage repair material, to thereby form a liquid reservoir; and
a step of disposing a second liquid leakage repair material, which is a curable composition, in a manner to cover the liquid reservoir and curing the second liquid leakage repair material.

<13> A liquid leakage repairing method, including:
a step of disposing a first liquid leakage repair material, which is a curable composition, at a part of a liquid-leaked portion of a duct and curing the first liquid leakage repair material, to thereby shrink an exposed part of the liquid-leaked portion;
a step of disposing a second liquid leakage repair material, which is a curable composition, around the exposed part shrunk and curing the second liquid leakage repair material, to thereby form a liquid reservoir; and
a step of disposing a third liquid leakage repair material, which is a curable composition, in a manner to cover the liquid reservoir and curing the third liquid leakage repair material.

<14> A liquid leakage repairing method, including:
a step of disposing a cured product of a first liquid leakage repair material, which is a curable composition, at a part of a liquid-leaked portion of a duct and also disposing the cured product around an exposed part of the liquid-leaked portion, which is a remaining part of the liquid-leaked portion other than the part, to thereby form a liquid reservoir; and
a step of further disposing a second liquid leakage repair material, which is a curable composition, in a manner to cover the liquid reservoir and curing the second liquid leakage repair material.

<15> The liquid leakage repairing method according to any one of <12> to <14>,
wherein the first liquid leakage repair material is an active-energy-ray-curable composition, and wherein the second liquid leakage repair material is an active-energy-ray-curable composition.

<16> The liquid leakage repairing method according to <13>,
wherein the first liquid leakage repair material is an active-energy-ray-curable composition,
wherein the second liquid leakage repair material is an active-energy-ray-curable composition, and
wherein the third liquid leakage repair material is an active-energy-ray-curable composition.

<17> The liquid leakage repairing method according to any one of <12> to <14>,
wherein the first liquid leakage repair material and the second liquid leakage repair material are each the liquid leakage repair material according to any one of <1> to <9>.

<18> The liquid leakage repairing method according to <13>,
wherein the first liquid leakage repair material, the second liquid leakage repair material, and the third liquid leakage repair material are each the liquid leakage repair material according to any one of <1> to <9>.

Advantageous Effects of Invention

The present invention can provide a liquid leakage repair material that can block liquid leakage easily and highly reliably when a liquid leaks from a duct though which a liquid is circulated, a liquid leakage repairing method using the liquid leakage repair material, a duct repaired with the liquid leakage repair material, and a liquid leakage repairing method that can block liquid leakage easily and highly reliably when a liquid leaks from a duct through which a liquid is circulated.

BRIEF DESCRIPTION OF DRAWINGS

FIG. 4E is an exemplary cross-sectional view for illustrating another example of a liquid leakage repairing method of the present invention (third embodiment) (part 5);

Figure 1A:
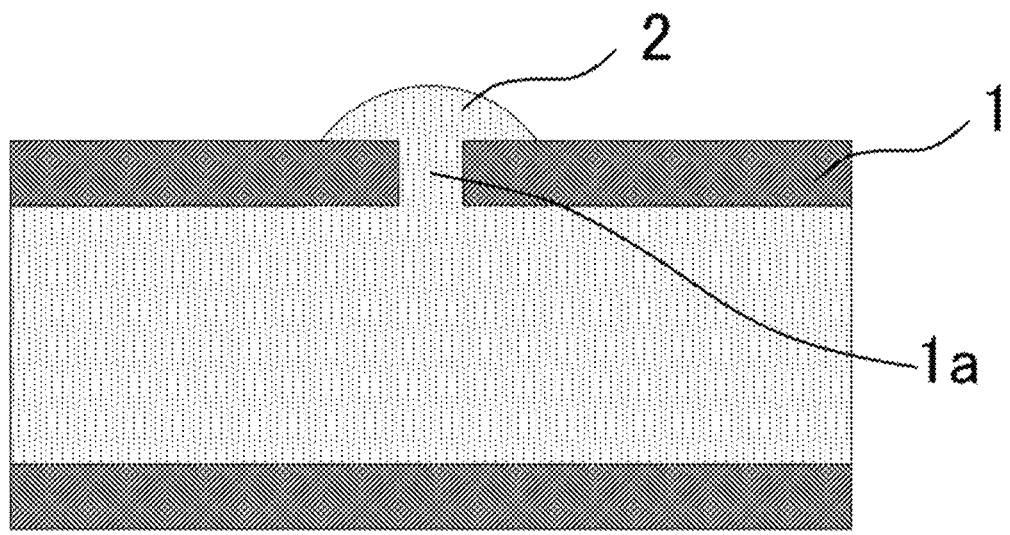
FIG. 1A is an exemplary cross-sectional view for illustrating an example of a liquid leakage repairing method of the present invention (first embodiment) (part 1)

DESCRIPTION OF EMBODIMENTS (Liquid Leakage Repair Material)

A liquid leakage repair material of the present invention is a curable composition.

A liquid absorption rate of the liquid leakage repair material after cured is lower than 10%. That is, a cured product of the liquid leakage repair material has a liquid absorption rate of lower than 10%.

The target liquid to be prevented from leakage by the liquid leakage repair material is not particularly limited and may be appropriately selected depending on the intended purpose. The liquid may be water or an oil.

The liquid leakage repair material is a curable composition. Therefore, it can be easily applied over a portion to be repaired, making it possible to block liquid leakage easily.

The liquid absorption rate of the liquid leakage repair material after cured is lower than 10%. Therefore, the liquid leakage absorption material after cured has an extremely low liquid absorption and a high liquid leakage seal property. Hence, the liquid leakage repair material can block liquid leakage highly reliably.

The liquid absorption rate of the liquid leakage repair material after cured is not particularly limited and may be appropriately selected depending on the intended purpose so long as it is lower than 10%. For example, it may be higher than 0% but lower than 10%, or 0.5% or higher but 5.0% or lower.

For example, the liquid absorption rate of the liquid leakage repair material after cured can be obtained in the manner described below.

The liquid leakage repair material is filled in a mold formed of a silicone resin and having a size of 10 mm×10 mm and a depth of 5 mm and the surface of the liquid leakage repair material is covered with releasable polyethylene terephthalate (PET) having a thickness of 50 micrometer. In this state, the curable composition is cured, to produce a cured product. The cured product is taken out from the mold and the weight of the cured product is measured as a weight before liquid absorption.

The cured product is put in a glass bottle. Further, a liquid is poured into the glass bottle in an amount enough to soak the whole cured product. Then, the cured product in the glass bottle is left to stand at room temperature (25 degrees C.) for 24 hours, and the weight of the cured product that has absorbed the liquid is measured as a weight after liquid absorption. As the liquid, for example, a high-pressure insulating oil A available from JXTG Energy Corporation (one kind of an insulating oil A compliant with JIS C2320) is used.

The liquid absorption rate is calculated according to the formula below.

Liquid absorption rate (%)=100×(weight after liquid absorption−weight before liquid absorption)/(weight before liquid absorption)

When the curable composition is an active-energy-ray-curable composition, the active-energy-ray-curable composition is cured by irradiation using a metal halide lamp until an integrated light quantity of 3 J/cm$^2$ at 365 nm.

It is preferable that the liquid leakage repair material be free of stringiness in terms of easy handleability. "Free of stringiness" can be confirmed by whether or not the liquid leakage repair material becomes stringy or not when the liquid leakage repair material is removed from a stainless steel spatula after the surface of the liquid leakage repair material is kept in contact with the spatula for 0.5 seconds, i.e., whether the spatula and the liquid leakage repair material physically connect with each other or not.

The viscosity of the liquid leakage repair material is not particularly limited, may be appropriately selected, and is preferably 0.1 Pa·s or higher but 100,000 Pa·s or lower.

The viscosity can be measured with, for example, a rheometer. Specifically, the viscosity is measured with AR-G2 available from TA Instruments, Inc., using a cone plate having a diameter of 20 mm and an angle of 2 degrees in an environment at a temperature of 5 degrees C. at a shear velocity of 0.1 s$^{-1}$.

The shear adhesive strength of the liquid leakage repair material is preferably 0.15 MPa or greater. With such a shear adhesive strength, the liquid leakage repair material has an excellent adhesiveness. The upper limit of the shear adhesive strength is not particularly limited and may be appropriately selected depending on the intended purpose. For example, the shear adhesive strength is 2.00 MPa or less.

For example, the shear adhesive strength can be measured by the method described below.

A circular mold formed of a silicone resin and having an inner diameter of 6 mm and a thickness of 2 mm is put on a SUS304 plate and filled with the liquid leakage repair material, and the liquid leakage repair material is cured. Subsequently, the mold formed of the silicone resin is removed, to produce a test piece (i.e., a cured product of the liquid leakage repair material adhering to the SUS304 plate, with a diameter of 6 mm and a thickness of 2 mm).

Then, using a universal bond tester 400 PLUS available from Nordson Dage Corporation, the test piece is tested at a test speed of 0.2 mm/s at a descending speed of 0.2 mm/s at a test height of 10.0 micrometers, to measure the shear adhesive strength.

When the curable composition is an active-energy-ray-curable composition, the active-energy-ray-curable composition is cured by irradiation using a metal halide lamp until an integrated light quantity of 3 J/cm$^2$ at 365 nm.

It is preferable that when the liquid leakage repair material is cured, a time taken until a storage modulus G' of the liquid leakage repair material reaches 0.07 MPa is 0.50 minutes or shorter. With such a property, the liquid leakage repair material has an excellent fast curability.

For example, the time taken until the storage modulus G' reaches 0.07 MPa can be measured by the method described below.

The curing speed is measured with a HAKKE MARS rheometer available from Thermo Fisher Scientific Inc. The curing speed is measured using a parallel plate having a diameter of 8 mm at a shear velocity of 0.1 s$^{-1}$ at a UVLED illuminance of 50 mW/cm$^2$ (365 nm). UV irradiation is performed with pre-idling for 1 minute, irradiation for 1 minute, and post-idling for 1 minute. The curing time is evaluated based on the time (minute) taken until G' (storage modulus) reaches 0.07 MPa (0.2 MPa or greater when converted to E'), seeing the timing, at which the pre-idling for 1 minute has passed, as 0 minutes.

G' represents a storage modulus under a shear stress, and E' represents a storage modulus under a uniaxial stress (tension/compression). G' and E' have a relationship of E'=3G'.

<Filler>

It is preferable that the liquid leakage repair material contain a filler.

When the liquid leakage repair material contains the filler, the liquid absorption rate of the liquid leakage repair material after cured can be reduced.

Examples of the filler include an inorganic filler and an organic filler. An inorganic filler is preferable in terms of weather resistance.

<<Organic Filler>>

Examples of the organic filler include polyurethane resin particles, polyimide resin particles, benzoguanamine resin particles, and epoxy resin particles.

Surface treatment may be applied to the organic filler.

One of these organic fillers may be used alone or two or more of these organic materials may be used in combination.

<<Inorganic Filler>>

The inorganic filler is not particularly limited and may be appropriately selected depending on the intended purpose.

The material of the inorganic filler is not particularly limited and may be appropriately selected depending on the intended purpose. Examples of the material of the inorganic filler include silica (silicon oxide), mica, talc, barium sulfate, aluminum hydroxide, aluminum oxide, magnesium hydroxide, magnesium oxide, titanium oxide, zinc oxide, and iron oxide. Among these materials, silica, mica, and talc are preferable and mica is more preferable in terms of an excellent adhesiveness with the repair target.

Surface treatment may be applied to the inorganic filler.

One of these inorganic fillers may be used alone or two or more of these inorganic fillers may be used in combination.

The average particle diameter of the filler is not particularly limited, may be appropriately selected depending on the intended purpose, and is preferably 1 micrometer or greater but 100 micrometers or less.

For example, the average particle diameter can be measured as D50 by a laser diffraction method.

The content of the filler in the liquid leakage repair material is not particularly limited, may be appropriately selected depending on the intended purpose, and is preferably 20% by mass or greater but 95% by mass or less, more preferably 30% by mass or greater but 93% by mass or less, and particularly preferably 40% by mass or greater but 93% by mass or less in terms of an excellent adhesiveness with the repair target.

<Other Components>

The liquid leakage repair material may contain other components so long as the function of the present invention is not spoiled. Examples of the other components include a surface conditioner, a dispersant, and a pigment.

<Curable Composition>

The curable composition may be a thermosetting composition, or an active-energy-ray-curable composition, or a thermosetting, active-energy-ray-curable composition. An active-energy-ray-curable composition is preferable in terms of fast curability and a greater repairing convenience.

It is preferable that the curable composition contain a monofunctional (meth)acrylate represented by General formula (1) below, a multifunctional (meth)acrylate, and a radical initiator.

(Meth)acrylate represents acrylate and methacrylate.

<<Monofunctional (Meth)Acrylate Represented by General Formula (1)>>

General formula (1)

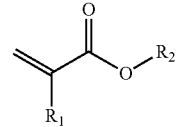

In General formula (1), $R_1$ represents a hydrogen atom or a methyl group, and $R_2$ represents an organic group containing four or more carbon atoms.

The organic group of $R_2$ may be straight-chained or branched-chained, or may have a cyclic structure.

The number of carbon atoms contained in the organic group is preferably 4 or greater, more preferably 8 or greater, and particularly preferably 10 or greater. The upper limit of the number of carbon atoms contained in the organic group is not particularly limited, and may be appropriately selected depending on the intended purpose. For example, the number of carbon atoms contained in the organic group may be 30 or less, or 20 or less.

The organic group may contain a heteroatom or may be free of a heteroatom. The heteroatom is not particularly limited and may be appropriately selected depending on the intended purpose so long as the heteroatom is an atom other than a carbon atom and a hydrogen atom. Examples of the heteroatom include an oxygen atom and a nitrogen atom.

The organic group may contain a hydroxyl group or may be free of a hydroxyl group.

It is preferable that the organic group be a hydrocarbon group.

Examples of the monofunctional (meth)acrylate represented by General formula (1) include aliphatic monofunctional (meth)acrylate, alicyclic monofunctional (meth) acrylate, and aromatic monofunctional (meth) acrylate.

Examples of the aliphatic monofunctional (meth)acrylate include decyl (meth)acrylate, isodecyl (meth) acrylate, lauryl (meth) acrylate, stearyl (meth)acrylate, and isostearyl (meth)acrylate.

One of these aliphatic monofunctional (meth)acrylates may be used alone or two or more of these aliphatic monofunctional (meth)acrylates may be used in combination.

Examples of the alicyclic monofunctional (meth)acrylate include isobornyl (meth)acrylate, dicyclopentenyl (meth)acrylate, and tricyclodecanyl (meth) acrylate.

One of these alicyclic monofunctional (meth)acrylates may be used alone or two or more of these alicyclic monofunctional (meth)acrylates may be used in combination.

The content of the monofunctional (meth)acrylate represented by General formula (1) above in the curable composition, which is the liquid leakage repair material, is not particularly limited, may be appropriately selected depending on the intended purpose, and is preferably 5% by mass or greater but 70% by mass or less, more preferably 10% by mass or greater but 65% by mass or less, and particularly preferably 20% by mass or greater but 50% by mass or less.

The content of the monofunctional (meth)acrylate represented by General formula (1) above in the curable composition, which is the liquid leakage repair material, is preferably 40% by mass or greater but 99% by mass or less, more preferably 50% by mass or greater but 99% by mass or less, and particularly preferably 80% by mass or greater but 98% by mass or less relative to all (meth)acrylates in the curable composition.

<<<Multifunctional (Meth)Acrylate>>>

The multifunctional (meth)acrylate is not particularly limited and may be appropriately selected depending on the intended purpose so long as the multifunctional (meth)acrylate is a bifunctional or higher (meth)acrylate. Examples of the multifunctional (meth)acrylate include bifunctional (meth)acrylate, trifunctional (meth) acrylate, and tetrafunctional (meth)acrylate.

One of these multifunctional (meth)acrylates may be used alone or two or more of these multifunctional (meth)acrylates may be used in combination.

Examples of the multifunctional (meth)acrylate include multifunctional (meth)acrylate containing a chain aliphatic hydrocarbon group, multifunctional (meth)acrylate containing an alicyclic group, and multifunctional (meth)acrylate containing an aromatic group.

Examples of the bifunctional (meth)acrylate include ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth)acrylate, polypropylene glycol di(meth)acrylate, butylene glycol di(meth)acrylate, neopentyl glycol di(meth)acrylate, ethylene oxide-modified bisphenol A-type di(meth)acrylate, propylene oxide-modified bisphenol A-type di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, tricyclodecane dimethanol di(meth)acrylate, phthalic acid diglycidyl ester di(meth)acrylate, hydroxypivalic acid-modified neopentyl glycol di(meth)acrylate, and urethane di(meth)acrylate.

One of these bifunctional (meth)acrylates may be used alone or two more of these bifunctional (meth)acrylates may be used in combination.

Examples of the trifunctional (meth)acrylate include trimethylolpropane tri(meth)acrylate, pentaerythritol tri(meth)acrylate, and tri(meth)acryloyloxyethoxy trimethylolpropane.

One of these trifunctional (meth)acrylates may be used alone or two or more of these trifunctional (meth)acrylates may be used in combination.

Examples of the tetrafunctional (meth)acrylate include pentaerythritol tetra(meth)acrylate.

One of these tetrafunctional (meth)acrylates may be used alone or two or more of these tetrafunctional (meth)acrylates may be used in combination.

Examples of the pentafunctional or higher (meth)acrylate include dipentaerythritol penta(meth)acrylate and dipentaerythritol hexa(meth)acrylate.

One of these pentafunctional or higher (meth)acrylates may be used alone or two or more of these pentafunctional or higher (meth)acrylates may be used in combination.

The content of the multifunctional (meth)acrylate in the curable composition, which is the liquid leakage repair material, is not particularly limited, may be appropriately selected depending on the intended purpose, and is preferably greater but 0% by mass but 30% by mass or less, more preferably 0.5% by mass or greater but 15% by mass or less, and particularly preferably 1% by mass or greater but 5% by mass or less.

The content of the multifunctional (meth)acrylate in the curable composition, which is the liquid leakage repair material, is preferably 0.5% by mass or greater but 60% by mass or less, more preferably 1% by mass or greater but 50% by mass or less, and particularly preferably 3% by mass or greater but 15% by mass or less relative to all (meth)acrylates in the curable composition.

<<<Radical Initiator>>>

Examples of the radical initiator include a thermal radical initiator and a photo radical initiator.

Examples of the photo radical initiator include benzophenones, benzyl ketals, dialkoxy acetophenones, hydroxyalkyl acetophenones, aminoalkylphenones, and acylphosphine oxides. Specific examples of the photo radical initiator include benzophenone, methyl benzophenone, 4-phenyl benzophenone, 4,4'-bis(dimethylamino)benzophenone, 4,4'-bis(diethylamino)benzophenone, benzyl, 2,2-dimethoxy-2-phenyl acetophenone, dimethoxyacetophenone, diethoxyacetophenone, 2-hydroxy-2-methyl-1-phenylpropan-1-one, 2-benzyl-2-dimethylamino-1-(4-morpholinophenyl)-butan-1-one, 2-methyl-1-[4-(methoxythio)-phenyl]-2-morpholinopropan-2-one, 1-hydroxy-cyclohexyl-phenyl ketone, diphenylacylphenyl phosphine oxide, diphenyl(2,4,6-trimethylbenzoyl)phosphine oxide, 2,4,6-trimethylbenzoylethoxyphenylphosphine oxide, and bis(2,4,6-trimethyl-benzoyl)phenylphosphine oxide.

One of these photo radical initiators may be used alone or two or more of these photo radical initiators may be used in combination.

The content of the radical initiator in the curable composition, which is the liquid leakage repair material, is not particularly limited, may be appropriately selected depending on the intended purpose, and is preferably 0.1% by mass or greater but 5% by mass or less, more preferably 0.5% by mass or greater but 4% by mass or less, and particularly preferably 1% by mass or greater but 3% by mass or less relative to all (meth)acrylates in the curable composition.

The method for curing the curable composition is not particularly limited and may be appropriately selected depending on the intended purpose. The curable composition is an active-energy-ray-curable composition. A method of curing the active-energy-ray-curable composition by irradiation with active energy rays is preferable. The active energy rays are not particularly limited and may be appropriately selected depending on the intended purpose.

Examples of the active energy rays include electron beams, ultraviolet rays, infrared rays, laser light beams, visible light rays, ionizing radiations (e.g., X rays, α rays, β rays, and γ rays), microwaves, and high-frequency waves.

(Liquid Leakage Repairing Method)

One embodiment of the liquid leakage repairing method of the present invention includes at least a curing step and further includes other steps as needed.

<Curing Step>

The curing step is not particularly limited and may be appropriately selected depending on the intended purpose so long as the curing step is a step of applying the liquid leakage repair material of the present invention, which is an active-energy-ray-curable composition, over a liquid-leaked portion of a duct, and irradiating the liquid leakage repair material with active energy rays to cure the liquid leakage repair material.

The duct is not particularly limited and may be appropriately selected depending on the intended purpose so long as the duct is a duct configured to send a liquid, and examples of the duct include a duct configured to send an insulating oil between a radiator and a transformer.

The material of the duct is not particularly limited and may be appropriately selected depending on the intended purpose so long as it is a metal. Examples of the duct include a duct formed of stainless steel.

The size and length of the duct are not particularly limited and may be appropriately selected depending on the intended purpose.

For example, anticorrosion coating may be applied over the surface of the duct so long as the function of the present invention is not spoiled.

The liquid-leaked portion of the duct is not particularly limited and may be appropriately selected depending on the intended purpose. Examples of the liquid-leaked portion include a hole (e.g., a pinhole and a linear through-hole) opened in the duct, and a joint (e.g., a flange portion) of the duct.

The method for applying the liquid leakage repair material over the liquid-leaked portion is not particularly limited and may be appropriately selected depending on the intended purpose. Examples of the method include brush painting, spatula painting, roller coating, and spray coating.

The active energy rays are not particularly limited and may be appropriately selected depending on the intended purpose. Examples of the active energy rays include electron beams, ultraviolet rays, infrared rays, laser light beams, visible light rays, ionizing radiations (e.g., X rays, α rays, β rays, and γ rays), microwaves, and high-frequency waves.

The amount by which the liquid leakage repair material is irradiated with the active energy rays is not particularly limited and may be appropriately selected depending on the intended purpose.

(Duct)

A duct of the present invention is a duct including a liquid-leaked portion, and includes a cured product of the liquid leakage repair material of the present invention over the liquid-leaked portion.

The duct is not particularly limited and may be appropriately selected depending on the intended purpose so long as the duct is a duct configured to send a liquid, and examples of the duct include a duct configured to send an insulating oil between a radiator and a transformer.

The material of the duct is not particularly limited and may be appropriately selected depending on the intended purpose so long as it is a metal. Examples of the duct include a duct formed of stainless steel.

The size and length of the duct are not particularly limited and may be appropriately selected depending on the intended purpose.

For example, anticorrosion coating may be applied over the surface of the duct so long as the function of the present invention is not spoiled.

The liquid-leaked portion of the duct is not particularly limited and may be appropriately selected depending on the intended purpose. Examples of the liquid-leaked portion include a hole (e.g., a pinhole and a linear through-hole) opened in the duct, and a joint (e.g., a flange portion) of the duct.

The method for curing the liquid leakage repair material is not particularly limited and may be appropriately selected depending on the intended purpose. Examples of the method include the curing step of the liquid leakage repairing method of the present invention.

(Liquid Leakage Repairing Method)

A liquid leakage repairing method of the present invention forms a liquid reservoir around an exposed part, which is an at least partially exposed part of a liquid-leaked portion of a duct, and subsequently disposes a curable composition in a manner to cover the liquid reservoir and cures the curable composition.

If the liquid-leaked portion is wholly covered with a curable composition at a time and the curable composition is cured in an attempt to repair the duct with a curable composition without forming a liquid reservoir, the liquid in the duct may push the curable composition due to the pressure in the duct and permeate the curable composition to make the curability unstable, or make the repaired portion distorted in shape. Hence, the repairing reliability is low.

As described above, the liquid leakage repairing method of the present invention forms a liquid reservoir around an exposed part, which is an at least partially exposed part of a liquid-leaked portion of a duct. Therefore, the liquid in the duct can leak out from the exposed part during the repair, the pressure in the duct does not increase, and the liquid in the duct has a small force of pushing the curable composition covering the liquid-leaked portion. Hence, the curable composition can avoid being permeated by the liquid to have an unstable curability, or the repaired portion can avoid being distorted in shape. In addition, the liquid leakage repairing method of the present invention does not fill and embed the liquid reservoir with the curable composition, but disposes the curable composition in a manner to cover the liquid reservoir and cure the curable composition. Therefore, even if the liquid is accumulated in the liquid reservoir, the curable composition covering the liquid reservoir is not easily permeated by the liquid, and curability of the curable composition does not easily become unstable. Hence, the liquid leakage repairing method of the present invention can guarantee the repairing reliability.

The liquid leakage repairing method of the present invention is as follows.

First Embodiment

One embodiment (first embodiment) of the liquid leakage repairing method of the present invention includes a step of disposing a first liquid leakage repair material, which is a curable composition, around a liquid-leaked portion of a duct and curing the first liquid leakage repair material, to thereby form a liquid reservoir, and a step of disposing a second liquid leakage repair material, which is a curable composition, in a manner to cover the liquid reservoir and curing the second liquid leakage repair material.

The liquid leakage repairing method does not need special devices and can hence prevent liquid leakage easily.

According to the liquid leakage repairing method, because the liquid that has leaked out from the liquid-leaked portion does not easily contact the curable composition, the liquid does not easily permeate the curable composition, the curability of the curable composition is stabilized, and liquid leakage can be prevented with a high reliability.

Accordingly, when the liquid leakage repairing method is employed, it is possible to block liquid leakage easily and highly reliably when a liquid leaks out from a duct through which is liquid is circulated.

Second Embodiment

Another embodiment (second embodiment) of the liquid leakage repairing method of the present invention includes a step of disposing a first liquid leakage repair material, which is a curable composition, at a part of a liquid-leaked portion of a duct and curing the first liquid leakage repair material, to thereby shrink an exposed part of the liquid-leaked portion, a step of disposing a second liquid leakage repair material, which is a curable composition, around the exposed part shrunk and curing the second liquid leakage repair material, to thereby form a liquid reservoir, and a step of disposing a third liquid leakage repair material, which is a curable composition, in a manner to cover the liquid reservoir and curing the third liquid leakage repair material.

The liquid leakage repairing method does not need special devices and can hence prevent liquid leakage easily.

According to the liquid leakage repairing method, because the liquid in the duct does not easily permeate the curable composition, the curability of the curable composition is stabilized and liquid leakage can be prevented with a high reliability.

Accordingly, when the liquid leakage repairing method is employed, it is possible to block liquid leakage easily and highly reliably when a liquid leaks out from a duct through which the liquid is circulated.

Moreover, when a liquid-leaked portion is wide, the liquid leakage repairing method forms a liquid reservoir after previously sealing a part of the liquid-leaked portion. Therefore, it is not necessary to form a large liquid reservoir. This provides a greater convenience.

Third Embodiment

Another embodiment (third embodiment) of the liquid leakage repairing method of the present invention includes a step of disposing a cured product of a first liquid leakage repair material, which is a curable composition, at a part of a liquid-leaked portion of a duct and also disposing the cured product around an exposed part of the liquid-leaked portion, which is a remaining part of the liquid-leaked portion other than the part, to thereby form a liquid reservoir, and a step of disposing a second liquid leakage repair material, which is a curable composition, in a manner to cover the liquid reservoir and curing the second liquid leakage repair material.

The liquid leakage repairing method does not need special devices and can hence prevent liquid leakage easily.

According to the liquid leakage repairing method, because the liquid in the duct does not easily permeate the curable composition, the curability of the curable composition is stabilized and liquid leakage can be prevented with a high reliability.

Accordingly, when the liquid leakage repairing method is employed, it is possible to block liquid leakage easily and highly reliably when a liquid leaks out from a duct through which is a liquid is circulated.

Moreover, when a liquid-leaked portion is wide, the liquid leakage repairing method forms a liquid reservoir after previously sealing a part of the liquid-leaked portion. Therefore, it is not necessary to form a large liquid reservoir. This provides a greater convenience.

In the first embodiment and the third embodiment, the first liquid leakage repair material and the second liquid leakage repair material may be the same liquid leakage repair material or may be different liquid leakage repair materials. It is preferable that the both be the same liquid leakage repair material because this provides a greater convenience.

In the second embodiment, the first liquid leakage repair material, the second liquid leakage repair material, and the third liquid leakage repair material may be the same liquid leakage repair material or may be different liquid leakage repair materials. It is preferable that all be the same liquid leakage repair material because this provides a greater convenience.

It is preferable that the first liquid leakage repair material be the liquid leakage repair material of the present invention.

It is preferable that the second liquid leakage repair material be the liquid leakage repair material of the present invention.

It is preferable that the third liquid leakage repair material be the liquid leakage repair material of the present invention.

It is preferable that the first liquid leakage repair material be an active-energy-ray-curable composition.

It is preferable that the second liquid leakage repair material be an active-energy-ray-curable composition.

It is preferable that the third liquid leakage repair material be an active-energy-ray-curable composition.

When the first liquid leakage repair material is an active-energy-ray-curable composition, the liquid leakage repairing method cures the first liquid leakage repair material by irradiation with active energy rays.

When the second liquid leakage repair material is an active-energy-ray-curable composition, the liquid leakage repairing method cures the second liquid leakage repair material by irradiation with active energy rays.

When the third liquid leakage repair material is an active-energy-ray-curable composition, the liquid leakage repairing method cures the third liquid leakage repair material by irradiation with active energy rays.

The active energy rays are not particularly limited and may be appropriately selected depending on the intended purpose. Examples of the active energy rays include electron beams, ultraviolet rays, infrared rays, laser light beams, visible light rays, ionizing radiations (e.g., X rays, $\alpha$ rays, $\beta$ rays, and $\gamma$ rays), microwaves, and high-frequency waves.

The duct is not particularly limited and may be appropriately selected depending on the intended purpose so long as the duct is a duct configured to send a liquid, and examples of the duct include a duct configured to send an insulating oil between a radiator and a transformer.

The material of the duct is not particularly limited and may be appropriately selected depending on the intended purpose so long as it is a metal. Examples of the duct include a duct formed of stainless steel.

The size and length of the duct are not particularly limited and may be appropriately selected depending on the intended purpose.

For example, anticorrosion coating may be applied over the surface of the duct so long as the function of the present invention is not spoiled.

The liquid-leaked portion of the duct is not particularly limited and may be appropriately selected depending on the intended purpose. Examples of the liquid-leaked portion include a hole (e.g., a pinhole and a linear through-hole) opened in the duct, and a joint (e.g., a flange portion) of the duct.

The method for disposing the first liquid leakage repair material around the liquid-leaked portion in the first embodiment is not particularly limited and may be appropriately selected depending on the intended purpose. Examples of the method include brush painting, spatula painting, and roller coating.

The method for disposing the second liquid leakage repair material in a manner to cover the liquid reservoir in the first embodiment is not particularly limited and may be appropriately selected depending on the intended purpose. Examples of the method include brush painting, spatula painting, and roller coating. Alternatively, it is optional to cover the liquid reservoir with the second liquid leakage repair material by placing a film, over which the second liquid leakage repair material is applied, over the liquid reservoir in a manner that the second liquid leakage repair material contacts a cured product of the first liquid leakage repair material.

The method for disposing the first liquid leakage repair material at a part of the liquid-leaked portion of the duct in the second embodiment is not particularly limited and may be appropriately selected depending on the intended purpose. Examples of the method include brush painting, spatula painting, and roller coating.

The method for disposing the second liquid leakage repair material around the exposed part shrunk in the second embodiment is not particularly limited and may be appropriately selected depending on the intended purpose. Examples of the method include brush painting, spatula painting, and roller coating.

The method for disposing the third liquid leakage repair material in a manner to cover the liquid reservoir in the second embodiment is not particularly limited and may be appropriately selected depending on the intended purpose.

Examples of the method include brush painting, spatula painting, and roller coating. Alternatively, it is optional to cover the liquid reservoir with the third liquid leakage repair material by placing a film, over which the third liquid leakage repair material is applied, over the liquid reservoir in a manner that the third liquid leakage repair material contacts a cured product of the second liquid leakage repair material.

The method for disposing a cured product of the first liquid leakage repair material at a part of the liquid-leaked portion of the duct and also disposing the cured product around an exposed part of the liquid-leaked portion, which is a remaining part of the liquid-leaked portion other than the part in the third embodiment is performed in the manner described below.

A film over which the first liquid leakage repair material is applied is prepared. Although the first liquid leakage repair material is applied over the film, the film has an un-applied part which is surrounded by the first liquid leakage repair material but over which the first liquid leakage repair material is not applied.

Next, the film is pasted on a duct in a manner that the first liquid leakage repair material contacts a part of a liquid-leaked portion of the duct and the un-applied part covers the exposed part.

Next, the first liquid leakage repair material is cured.

The method for disposing the second liquid leakage repair material in a manner to cover the liquid reservoir in the third embodiment is not particularly limited and may be appropriately selected depending on the intended purpose. Examples of the method include brush painting, spatula painting, and roller coating. Alternatively, it is optional to cover the liquid reservoir with the second liquid leakage repair material by placing a film, over which the second liquid leakage repair material is applied, over the liquid reservoir in a manner that the second liquid leakage repair material contacts a cured product of the first liquid leakage repair material.

An example of the liquid leakage repairing method (first embodiment) will be described with reference to FIG. 1A to FIG. 1F.

FIG. 1A is an exemplary cross-sectional view of a duct 1 in which a liquid-leaked portion 1*a* (pinhole) is opened. A liquid 2 in the duct 1 leaks out from the liquid-leaked portion 1*a*.

Figure 1B:
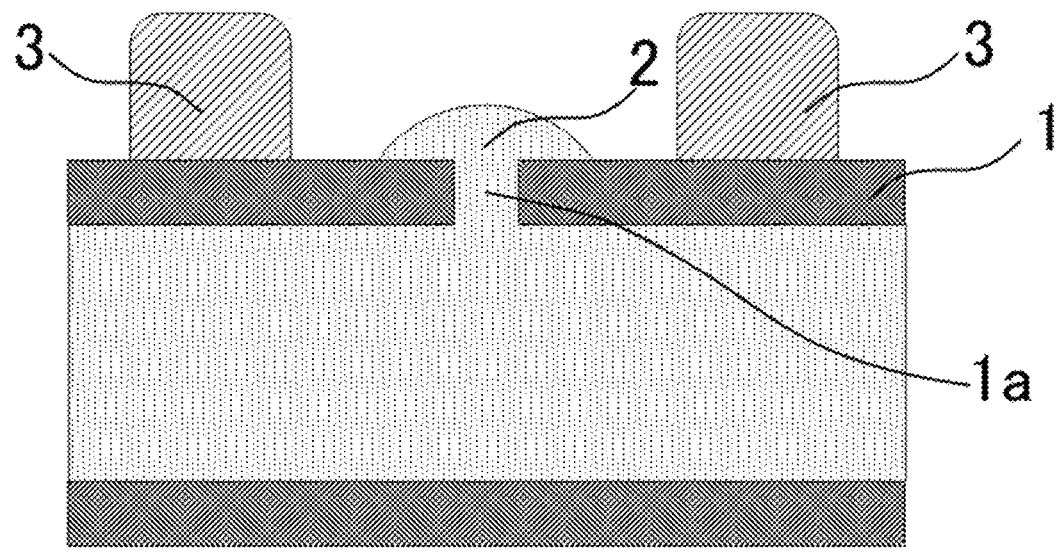
FIG. 1B is an exemplary cross-sectional view for illustrating an example of a liquid leakage repairing method of the present invention (first embodiment) (part 2)

A first liquid leakage repair material 3, which is an active-energy-ray-curable composition, is applied around the liquid-leaked portion 1*a* of the duct 1 by spatula painting in a manner that the first liquid leakage repair material 3 does not contact the liquid 2 that has leaked out from the liquid-leaked portion 1*a* (FIG. 1B).

Figure 1C:
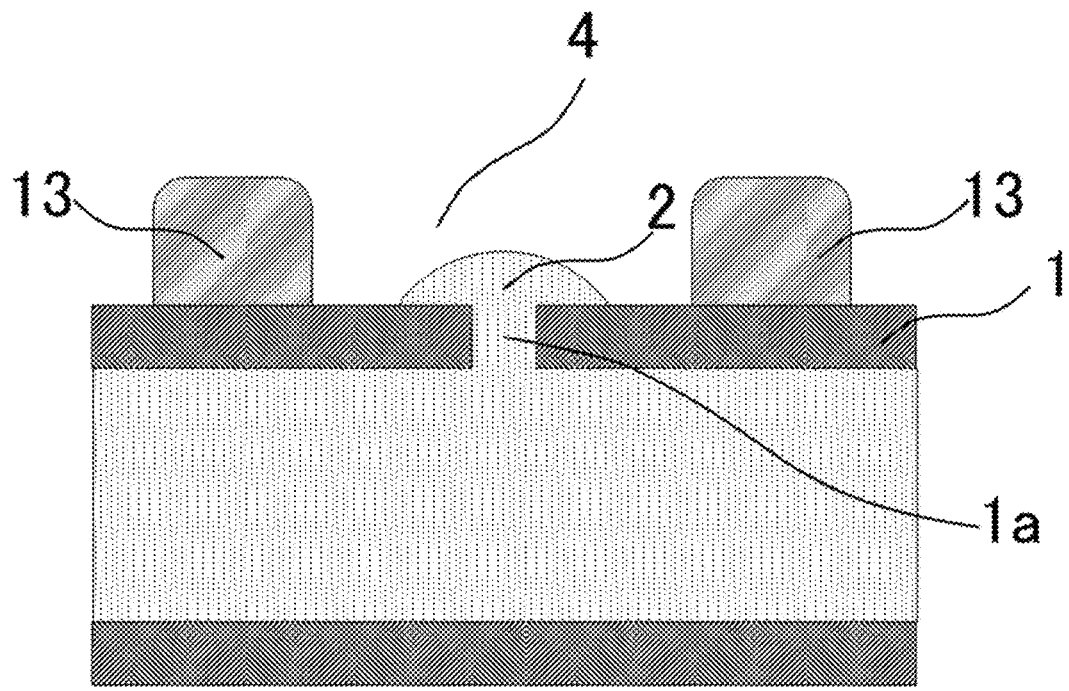
FIG. 1C is an exemplary cross-sectional view for illustrating an example of a liquid leakage repairing method of the present invention (first embodiment) (part 3)

Next, the first liquid leakage repair material 3 is cured by irradiation with active energy rays, to obtain a cured product 13 of the first liquid leakage repair material (FIG. 1C). As a result, a liquid reservoir 4 surrounded by the cured product 13 of the first liquid leakage repair material is formed around the liquid-leaked portion 1*a*.

Figure 1D:
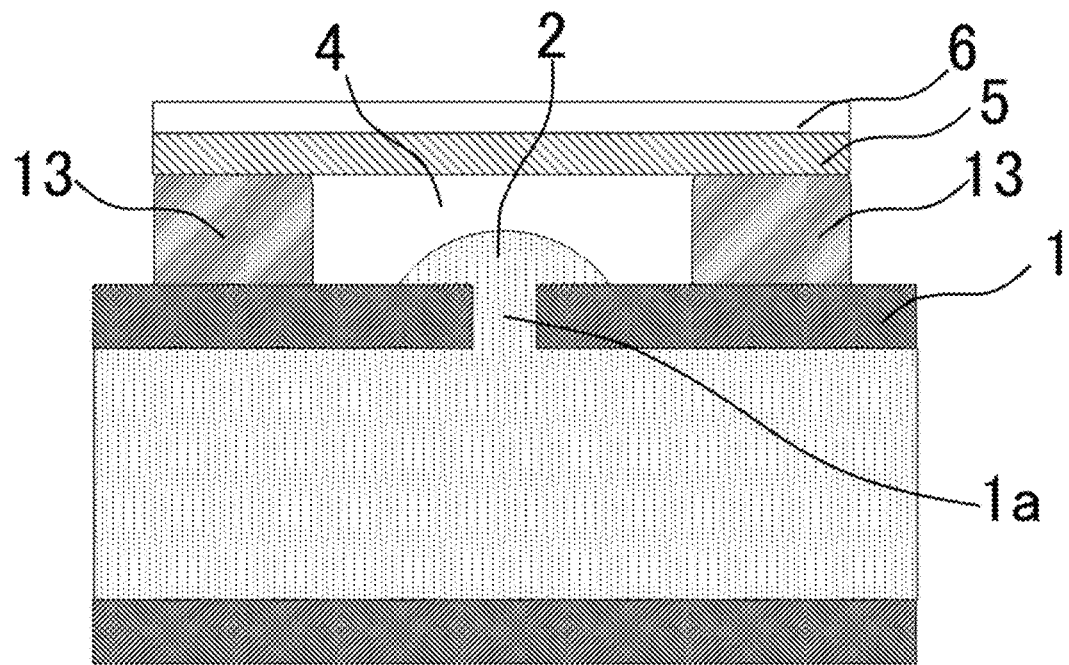
FIG. 1D is an exemplary cross-sectional view for illustrating an example of a liquid leakage repairing method of the present invention (first embodiment) (part 4)

Next, a base material film 6 over which a second liquid leakage repair material 5, which is an active-energy-ray-curable composition, is applied is placed over the liquid reservoir 4 in a manner that the second liquid leakage repair material 5 contacts the cured product 13 of the first liquid leakage repair material but the second liquid leakage repair material 5 does not contact the liquid 2 that has leaked out from the liquid-leaked portion 1*a*, to thereby cover the liquid reservoir 4 with the second liquid leakage repair material 5 (FIG. 1D).

Figure 1E:
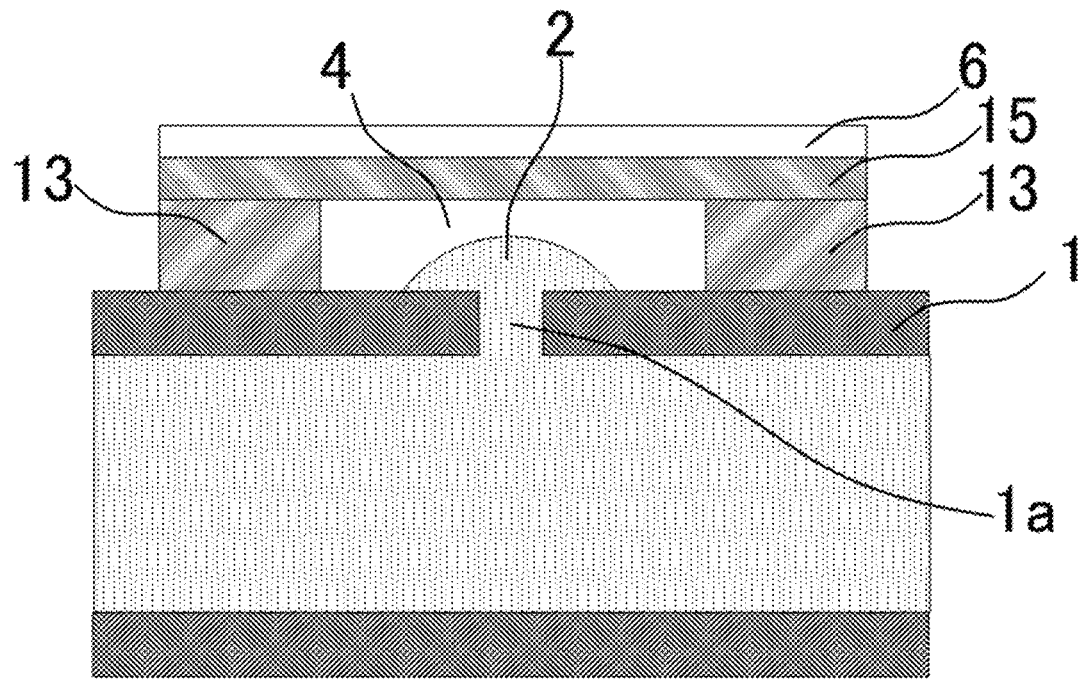
FIG. 1E is an exemplary cross-sectional view for illustrating an example of a liquid leakage repairing method of the present invention (first embodiment) (part 5)

Next, the second liquid leakage repair material 5 is cured by irradiation of the second liquid leakage repair material 5 with active energy rays through the base material film 6, to obtain a cured product 15 of the second liquid leakage repair material (FIG. 1E). In this way, the liquid-leaked portion 1*a* can be covered with the cured product of the liquid leakage repair material.

Figure 1F:
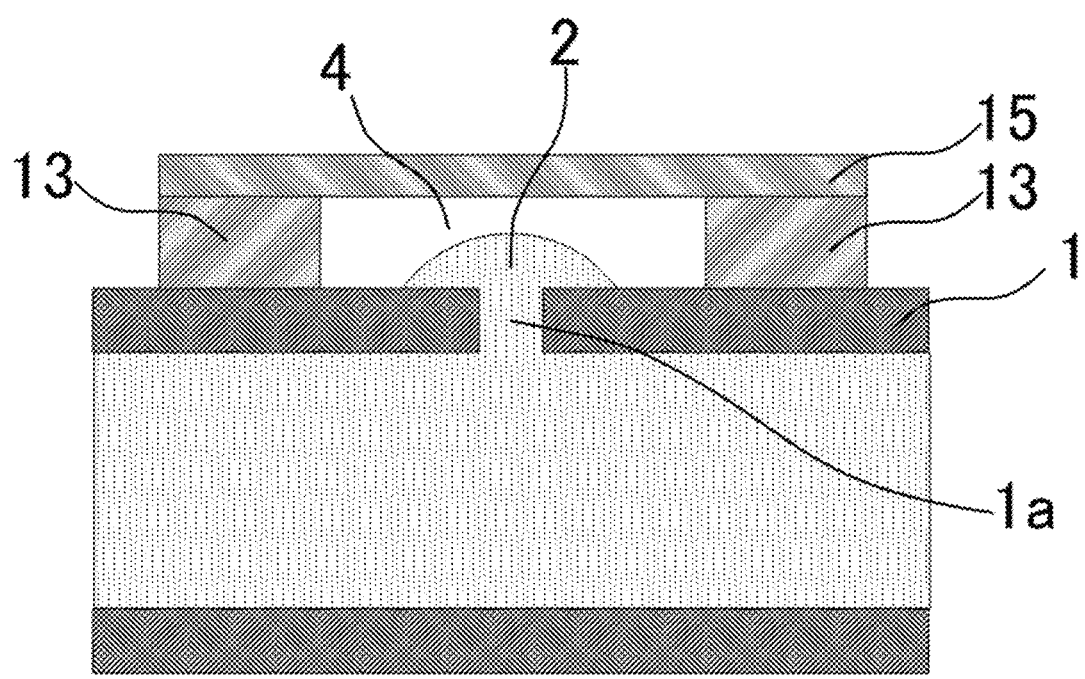
FIG. 1F is an exemplary cross-sectional view for illustrating an example of a liquid leakage repairing method of the present invention (first embodiment) (part 6)

Next, as needed, the base material film 6 is peeled (FIG. 1F).

Next, an example of the liquid leakage repairing method (second embodiment) will be described with reference to FIG. 2A to FIG. 2C.

Figure 2A:
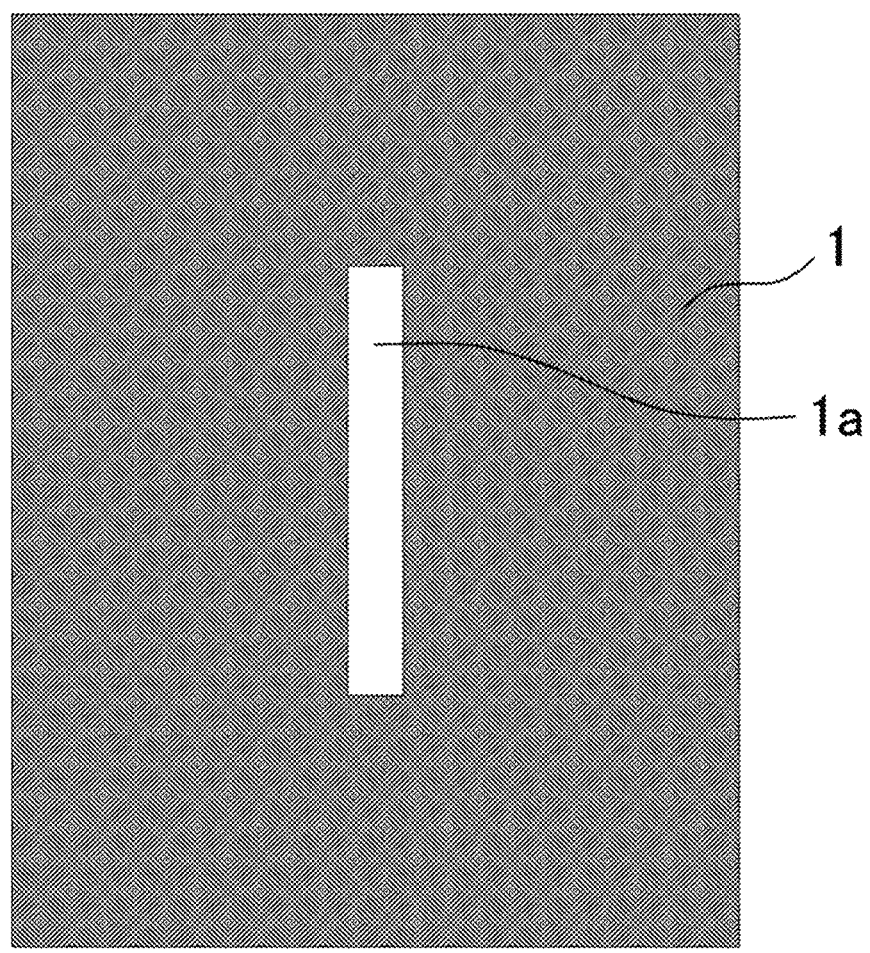
FIG. 2A is an exemplary cross-sectional view for illustrating an example of a liquid leakage repairing method of the present invention (second embodiment) (part 1)

FIG. 2A is an exemplary top view of a duct 1 in which a liquid-leaked portion 1*a* (a linear through-hole such as a slit) is opened.

First, a liquid that has leaked out from the liquid-leaked portion 1*a* is wiped away with, for example, a waste cloth.

Figure 2B:
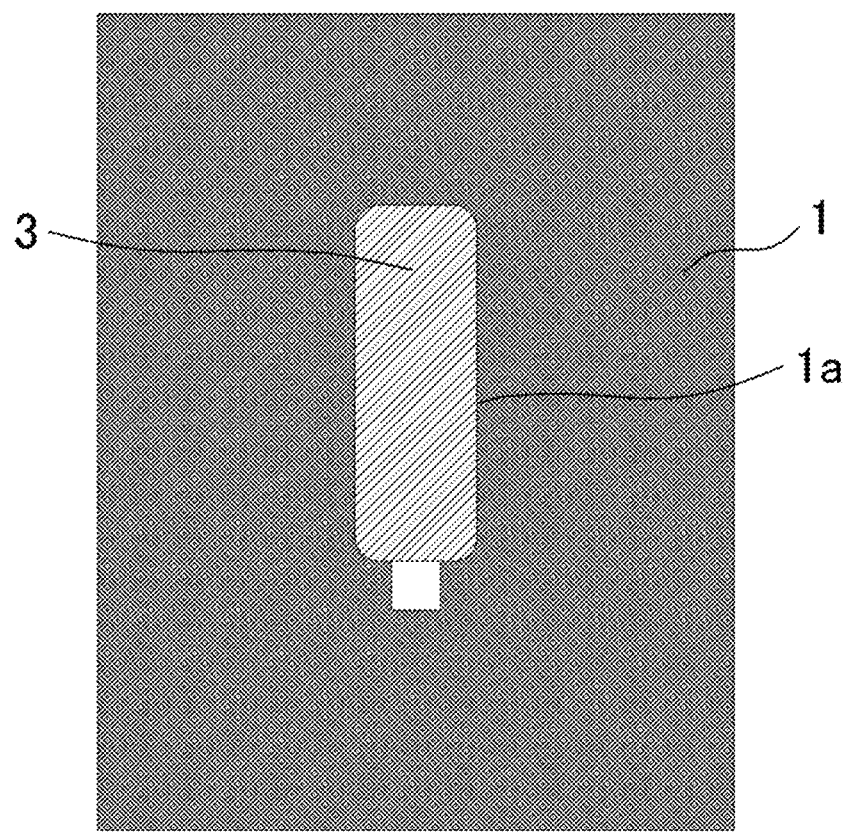
FIG. 2B is an exemplary cross-sectional view for illustrating an example of a liquid leakage repairing method of the present invention (second embodiment) (part 2)

Immediately subsequently, a first liquid leakage repair material 3, which is an active-energy-ray-curable composition, is applied by spatula painting in a manner to cover a part of an overhead portion of the liquid-leaked portion 1*a* of the duct 1 (FIG. 2B). Then, the first liquid leakage repair material 3 is cured by irradiation with active energy rays.

Figure 2C:
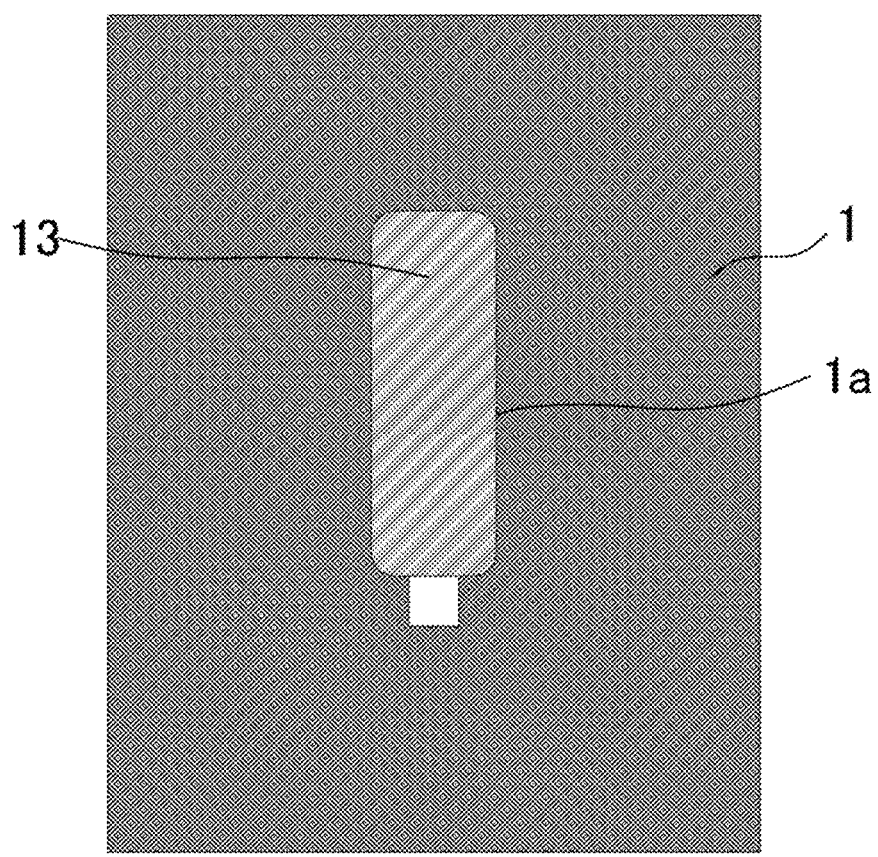
FIG. 2C is an exemplary cross-sectional view for illustrating an example of a liquid leakage repairing method of the present invention (second embodiment) (part 3)

In this way, an exposed part of the liquid-leaked portion 1a is shrunk with a cured product 13 of the first liquid leakage repair material (FIG. 2C).

Subsequently, the following steps are performed in the same manners as in FIG. 1C to FIG. 1F referred to above.

A second liquid leakage repair material, which is an active-energy-ray-curable composition, is applied by spatula painting around the exposed part shrunk, in a manner that the second liquid leakage repair material does not contact the liquid that has leaked out from the exposed part shrunk.

Next, the second liquid leakage repair material is cured by irradiation with active energy rays, to obtain a cured product of the second liquid leakage repair material. As a result, a liquid reservoir surrounded by a cured product of the second liquid leakage repair material is formed around the exposed part shrunk.

Next, a base material film over which a third liquid leakage repair material, which is an active-energy-ray-curable composition, is applied is placed over the liquid reservoir in a manner that the third liquid leakage repair material contacts the cured product of the second liquid leakage repair material but the third liquid leakage repair material does not contact the liquid that has leaked out from the exposed part shrunk, to thereby cover the liquid reservoir with the third liquid leakage repair material.

Next, the third liquid leakage repair material is cured by irradiation of the third liquid leakage repair material with active energy rays through the base material film, to obtain a cured product of the third liquid leakage repair material. In this way, the exposed part shrunk can be covered with the cured product of the liquid leakage repair material.

Next, as needed, the base material film is peeled.

Next, an example of the liquid leakage repairing method (third embodiment) will be described with reference to FIG. 3A to FIG. 3F.

Figure 3A:
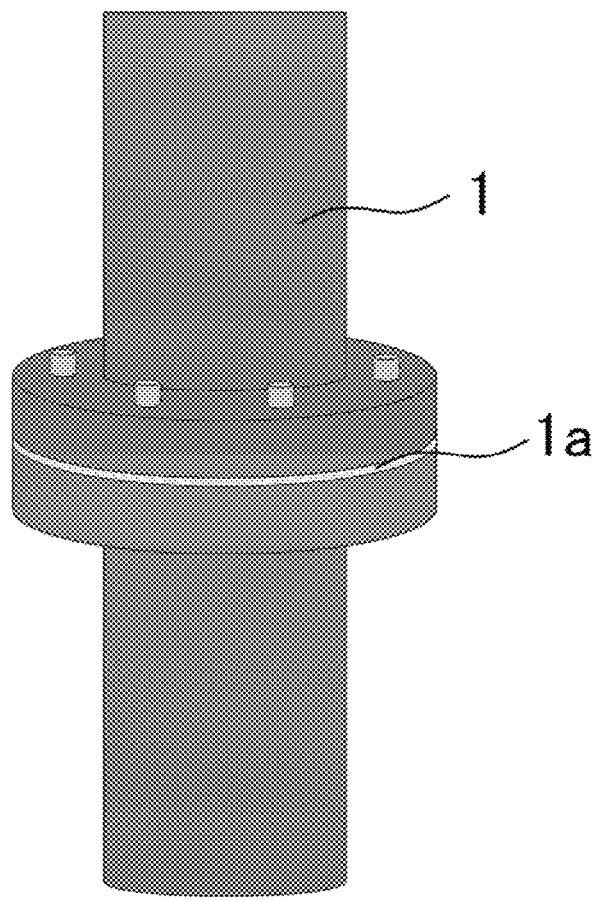
FIG. 3A is an exemplary cross-sectional view for illustrating an example of a liquid leakage repairing method of the present invention (third embodiment) (part 1)

In the following example, a joint portion (flange portion) of a duct 1 is a liquid-leaked portion 1a (FIG. 3A).

Figure 3B:
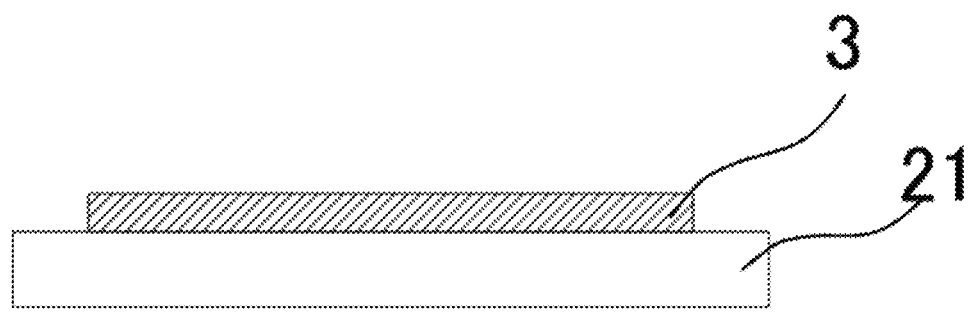
FIG. 3B is an exemplary cross-sectional view for illustrating an example of a liquid leakage repairing method of the present invention (third embodiment) (part 2)
Figure 3C:
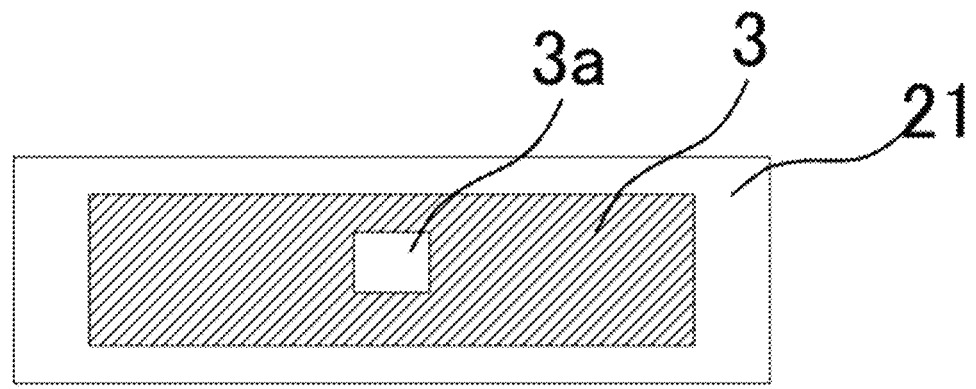
FIG. 3C is an exemplary cross-sectional view for illustrating an example of a liquid leakage repairing method of the present invention (third embodiment) (part 3)

First, a light transmissive film 21 over which a first liquid leakage repair material 3 is applied is prepared (FIG. 3B). Examples of the light transmissive film 21 include a silicone sheet and a polytetrafluoroethylene (PTFE) sheet. Although the first liquid leakage repair material 3, which is an active-energy-ray-curable composition, is applied over the light transmissive film 21, the light transmissive film 21 has an un-applied part 3a which is surrounded by the first liquid leakage repair material 3 but over which the first liquid leakage repair material 3 is not applied (FIG. 3C). FIG. 3B is an exemplary cross-sectional view and FIG. 3C is an exemplary top view.

Figure 3D:
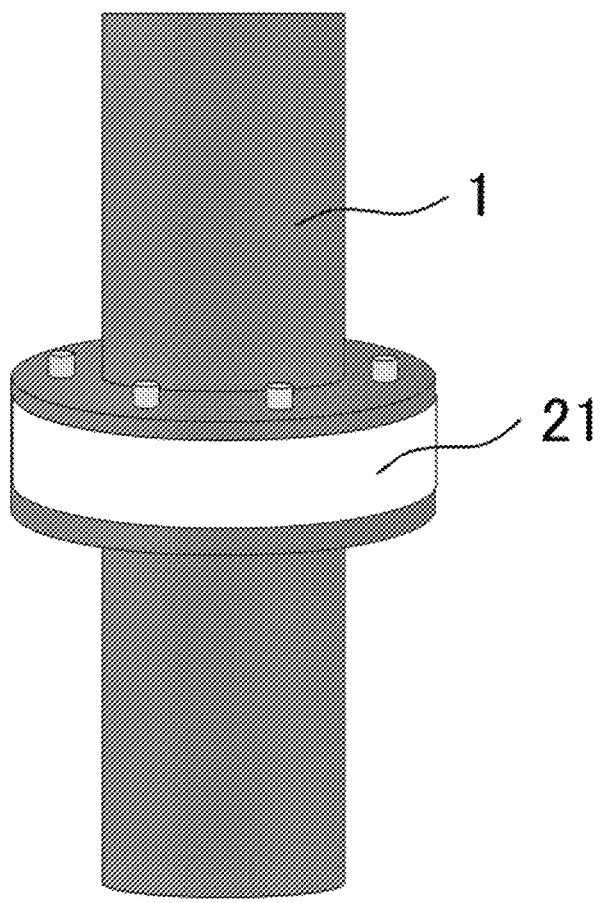
FIG. 3D is an exemplary cross-sectional view for illustrating an example of a liquid leakage repairing method of the present invention (third embodiment) (part 4)

Next, the light transmissive film 21 is pasted in a manner to cover the liquid-leaked portion 1a of the duct 1 (FIG. 3D). Then, the first liquid leakage repair material 3 is cured by irradiation with active energy rays through the light transmissive film 21, to obtain a cured product 13 of the first liquid leakage repair material 3.

Figure 3E:
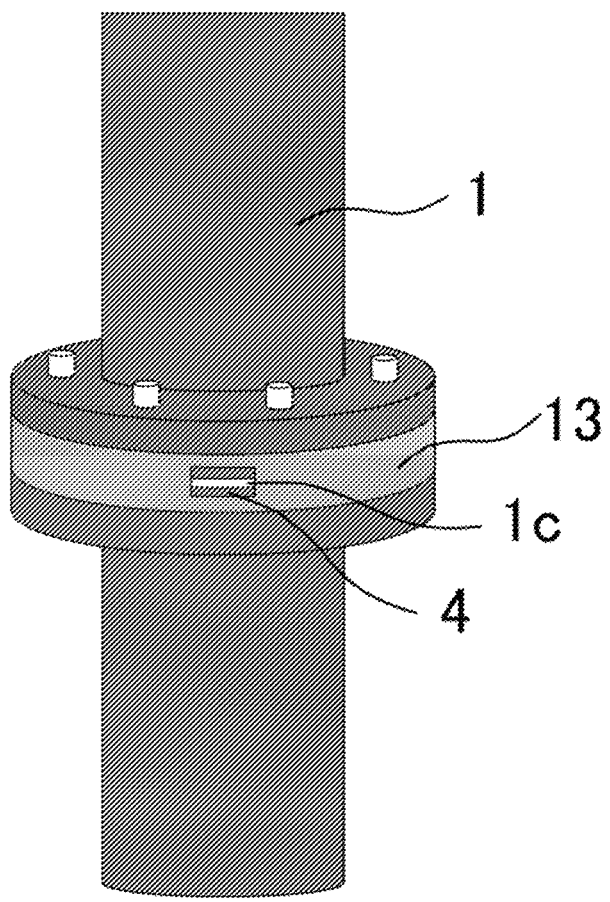
FIG. 3E is an exemplary cross-sectional view for illustrating an example of a liquid leakage repairing method of the present invention (third embodiment) (part 5)

Next, the light transmissive film 21 is peeled (FIG. 3E). As a result, a liquid reservoir 4 is formed around an exposed part 1c of the liquid-leaked portion 1a, which is a remaining part of the liquid-leaked portion other than a part.

Figure 3F:
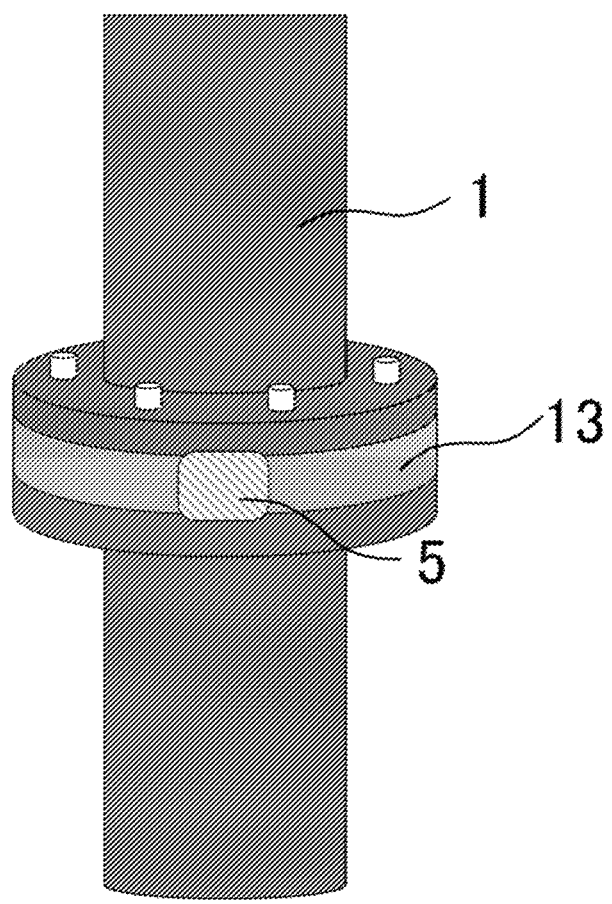
FIG. 3F is an exemplary cross-sectional view for illustrating an example of a liquid leakage repairing method of the present invention (third embodiment) (part 6)

Next, a second liquid leakage repair material 5, which is an active-energy-ray-curable composition, is disposed in a manner to cover the liquid reservoir 4 (FIG. 3F).

Figure 3G:
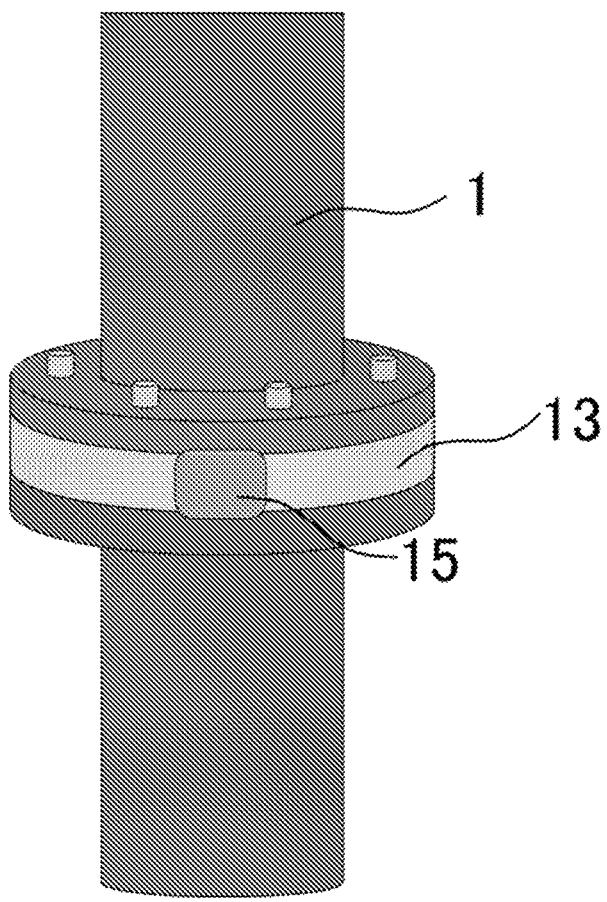
FIG. 3G is an exemplary cross-sectional view for illustrating an example of a liquid leakage repairing method of the present invention (third embodiment) (part 7)

Next, the second liquid leakage repair material 5 is cured by irradiation of the second liquid leakage repair material 5 with active energy rays, to obtain a cured product 15 of the second liquid leakage repair material (FIG. 3G).

In the above example of the third embodiment, the sheet illustrated in FIG. 3C is pasted over the liquid-leaked portion and the liquid leakage repair material is cured, to thereby form the liquid reservoir in a one-step process. However, in the third embodiment, a liquid reservoir may be formed in the manner described below.

Figure 4A:
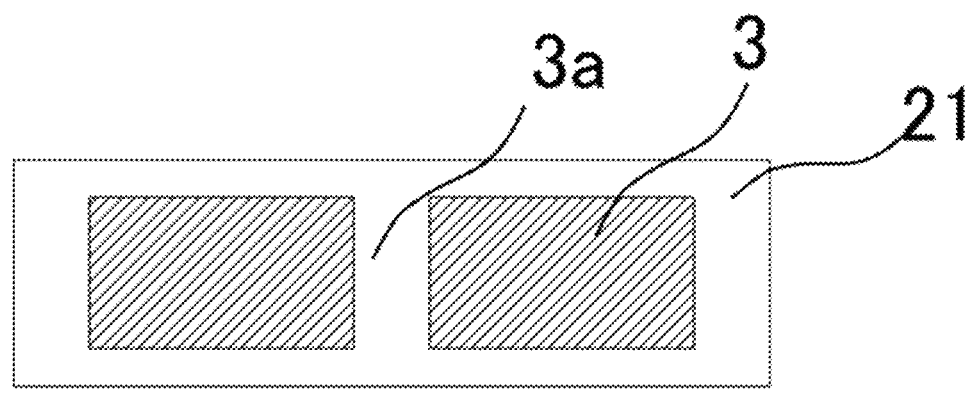
FIG. 4A is an exemplary cross-sectional view for illustrating another example of a liquid leakage repairing method of the present invention (third embodiment) (part 1)

First, a light transmissive film 21 over which a first liquid leakage repair material 3 is applied as illustrated in FIG. 4A is prepared. Although the first liquid leakage repair material 3, which is an active-energy-ray-curable composition, is applied over the light transmissive film 21, because the first liquid leakage repair material 3 is applied dividedly over the light transmissive film 21, the light transmissive film 21 has an un-applied part 3a over which the first liquid leakage repair material 3 is not applied, between the divided sections (FIG. 4A).

Next, the light transmissive film 21 is pasted in a manner to cover the liquid-leaked portion 1a of the duct 1. Further, the first liquid leakage repair material 3 is cured by irradiation with active energy rays through the light transmissive film 21, to obtain a cured product 13 of the first liquid leakage repair material 3.

Figure 4B:
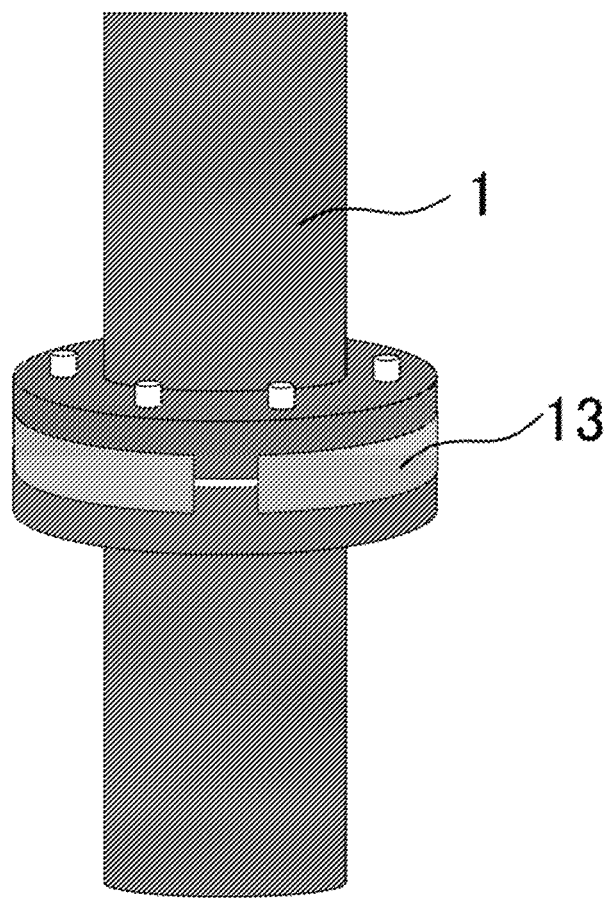
FIG. 4B is an exemplary cross-sectional view for illustrating another example of a liquid leakage repairing method of the present invention (third embodiment) (part 2)

Next, the light transmissive film 21 is peeled (FIG. 4B). As a result, a part of the liquid-leaked portion 1a is covered with the cured product 13 of the first liquid repair material 3.

Figure 4C:
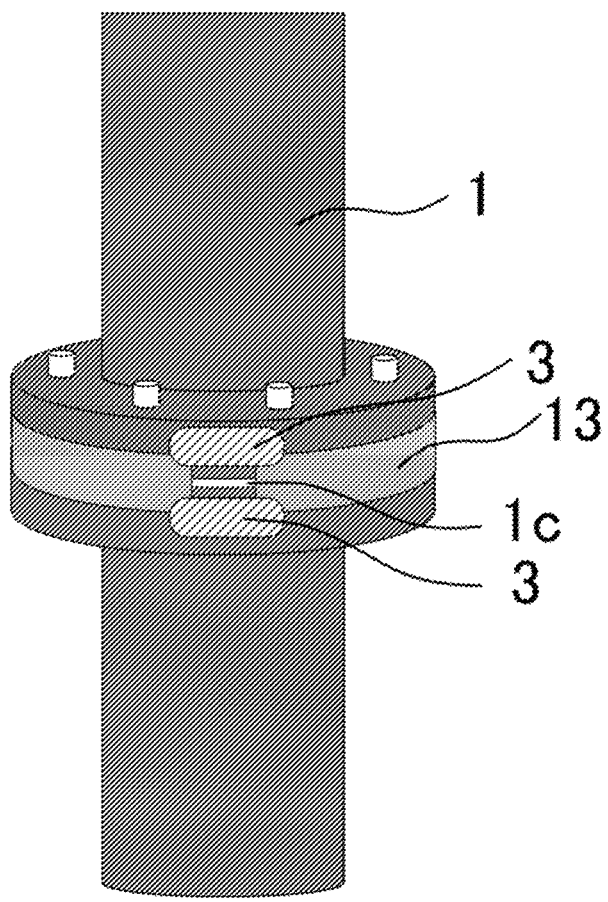
FIG. 4C is an exemplary cross-sectional view for illustrating another example of a liquid leakage repairing method of the present invention (third embodiment) (part 3)

Next, the first liquid leakage repair material 3 is applied above and below the exposed part of the liquid-leaked portion 1a and over the cured product 13 of the first liquid leakage repair material 3 near the exposed part (FIG. 4C).

Figure 4D:
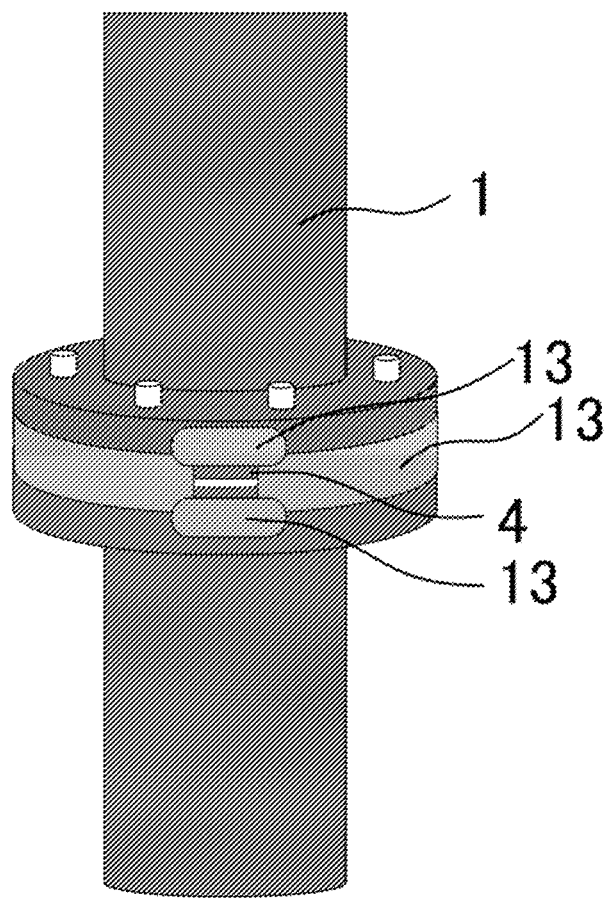
FIG. 4D is an exemplary cross-sectional view for illustrating another example of a liquid leakage repairing method of the present invention (third embodiment) (part 4)

Next, the first liquid leakage repair material 3 is cured by irradiation of the first liquid leakage repair material 3 with active energy rays, to obtain a cured product 13 of the liquid leakage repair material 3 (FIG. 4D). As a result, a liquid reservoir 4 is formed around the exposed part 1c of the liquid-leaked portion 1a, which is a remaining part of the liquid-leaked portion 1a other than the part.

Next, a second liquid leakage repair material 5, which is an active-energy-ray-curable composition, is disposed in a manner to cover the liquid reservoir 4 (FIG. 4E).

Figure 4F:
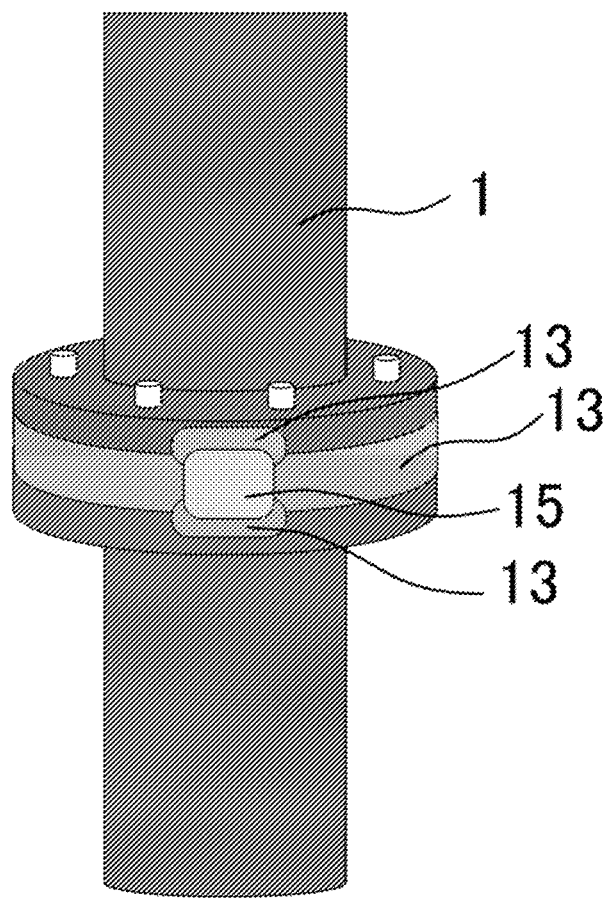
FIG. 4F is an exemplary cross-sectional view for illustrating another example of a liquid leakage repairing method of the present invention (third embodiment) (part 6)

Next, the second liquid leakage repair material 5 is cured by irradiation of the second liquid leakage repair material 5 with active energy rays, to obtain a cured product 15 of the second liquid leakage repair material (FIG. 4F).

An applied example of the liquid leakage repairing method will be described below.

When the viscosity of the first liquid leakage repair material is sufficiently high, for example, when the first liquid leakage repair material is putty and can form a liquid reservoir without being cured, a liquid leakage repairing method described below may be employed.

The first liquid leakage repair material, which is a curable composition, is disposed around a liquid-leaked portion of a duct, to thereby form a liquid reservoir.

Next, a second liquid leakage repair material, which is a curable composition, is disposed in a manner to cover the liquid reservoir. Then, the first liquid leakage repair material and the second liquid leakage repair material are cured.

EXAMPLES

The present invention will be described below by way of Examples. The present invention should not be construed as being limited to these Examples.

Comparative Example 1

<Production of Liquid Leakage Repair Material>

The components described in Table 1-1 were mixed at the mix proportion described in Table 1-1. In this way, an active-energy-ray-curable composition serving as a liquid leakage repair material was produced.

Example 1

<Production of Liquid Leakage Repair Material>

In the prescription described in Table 1-1, the components described in the "Binder" field were mixed at the mix proportion described in Table 1-1. A filler was added to the obtained mixture at the mix proportion described in Table 1-1, and the resultant was subjected to planetary stirring using a planetary stirrer (AR-250: obtained from THINKY Corporation) at a rotation number of 2,000 rpm. In this way, an active-energy-ray-curable composition serving as a liquid leakage repair material was produced.

Examples 2 to 14, and Comparative Example 2

An active-energy-ray-curable composition serving as a liquid leakage repair material was produced in the same manner as in Example 1, except that unlike in Example 1, the prescription was changed to as described in Table 1-1 to Table 1-4.

[Measurement/Evaluation]

Measurement and evaluation described below were performed. The results are presented in Table 1-1 to Table 1-4.

<Viscosity Measurement>

The viscosity was measured using a rheometer. Specifically, the viscosity was measured using AR-G2 obtained from TA Instruments, Inc., and a cone plate having a diameter of 20 mm and an angle of 2 degrees in an environment at a temperature of 25 degrees C. at a shear velocity of $0.1\ s^{-1}$.

<Stringiness>

Whether or not the liquid leakage repair material became stringy or not when the liquid leakage repair material was removed from a stainless steel spatula after the surface of the liquid leakage repair material was kept in contact with the spatula for 0.5 seconds, i.e., whether the spatula and the liquid leakage repair material physically connected with each other or not was visually confirmed and evaluated according to the evaluation criteria described below.

[Evaluation Criteria]

B: The liquid leakage repair material did not become stringy.

D: The liquid leakage repair material became stringy.

<Method for Evaluating Liquid Absorption Property (Liquid Absorption Rate after Curing)>

The liquid leakage repair material was filled in a mold formed of a silicone resin and having a size of 10 mm×10 mm and a depth of 5 mm and the surface of the liquid leakage repair material was covered with releasable PET having a thickness of 50 micrometers. In this state, the liquid leakage repair material was cured by irradiation using a metal halide lamp until an integrated light quantity of 3 J/cm² at 365 nm, to produce a cured product. The cured product was taken out from the mold and the weight of the cured product was measured as a weight before liquid absorption.

The cured product was put in a glass bottle. Further, an insulating oil was poured into the glass bottle in an amount enough to soak the whole cured product. Then, the cured product in the glass bottle was left to stand at room temperature (25 degrees C.) for 24 hours, and the weight of the cured product that had absorbed the insulating oil was measured as a weight after liquid absorption. As the insulating oil, a high-pressure insulating oil A obtained from JXTG Energy Corporation (one kind of an insulating oil A compliant with JIS C2320) was used.

The liquid absorption rate was calculated according to the formula below.

Liquid absorption rate (%)=100×(weight after liquid absorption−weight before liquid absorption)/(weight before liquid absorption)

<Curing Speed>

The curing speed was measured with a HAKKE MARS rheometer obtained from Thermo Fisher Scientific Inc. The curing speed was measured using a parallel plate having a diameter of 8 mm at a shear velocity of $0.1\ s^{-1}$ at a UVLED illuminance of 50 mW/cm² (365 nm). UV irradiation was performed with pre-idling for 1 minute, irradiation for 1 minute, and post-idling for 1 minute. The curing time was evaluated based on the time (minute) taken until G' (storage modulus) reached 0.07 MPa (0.2 MPa or greater when converted to E'), seeing the timing, at which the pre-idling for 1 minute had passed, as 0 minutes. The curing speed was evaluated according to the evaluation criteria described below.

The curing time for when the initial storage modulus (G') of the liquid leakage repair material was 0.07 MPa or greater is not described below because the needed storage modulus had been reached already initially.

[Evaluation Criteria]

A: The storage modulus had already reached 0.07 MPa or greater at the measurement.

B: The time taken to reach the needed storage modulus was longer than 0 minutes but 0.30 minutes or shorter C: The time taken to reach the needed storage modulus was longer than 0.30 minutes but 0.50 minutes or shorter.

D: The time taken to reach the needed storage modulus was longer than 0.50 minutes.

<Shear Adhesive Strength>

A circular mold formed of a silicone resin and having an inner diameter of 6 mm and a thickness of 2 mm was put on a SUS304 plate and filled with the liquid leakage repair material, and the liquid leakage repair material was cured by irradiation using a metal halide lamp until an integrated light quantity of 3 J/cm² (365 nm). Subsequently, the mold formed of the silicone resin was removed, to produce a test piece (i.e., a cured product of the liquid leakage repair material adhering to the SUS304 plate, with a diameter of 6 mm and a thickness of 2 mm).

Then, using a universal bond tester 4000 PLUS obtained from Nordson Dage Corporation, the test piece was tested at a test speed of 0.2 mm/s at a descending speed of 0.2 mm/s at a test height of 10.0 micrometers, to measure the shear adhesive strength. The shear adhesive strength was evaluated according to the evaluation criteria described below.

[Evaluation Criteria]

A: The shear adhesive strength was 0.30 MPa or greater.

B: The shear adhesive strength was 0.20 MPa or greater but less than 0.30 MPa.

C: The shear adhesive strength was 0.15 MPa or greater but less than 0.20 MPa.

D: The shear adhesive strength was less than 0.15 MPa.

<Liquid Leakage Seal Test>

Figure 5:
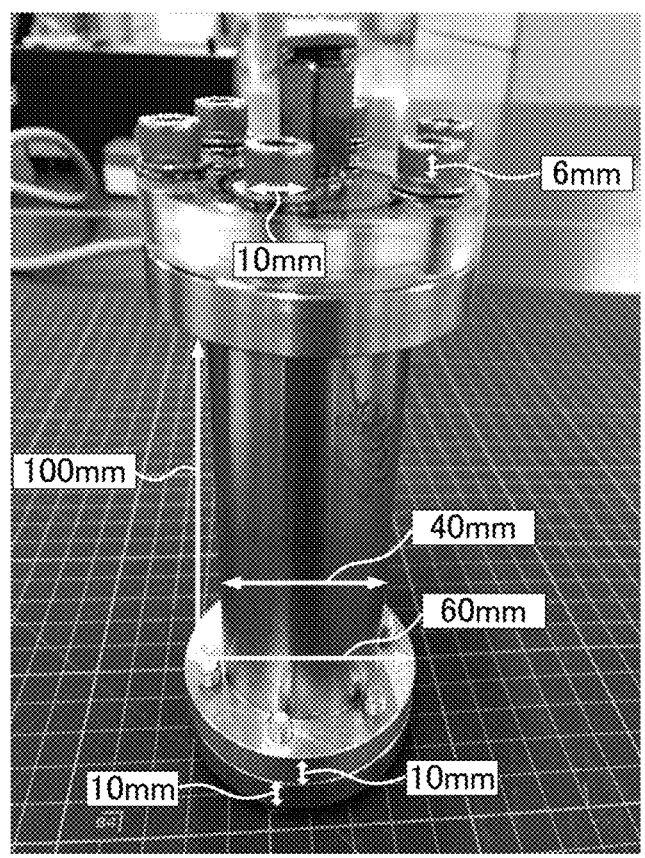
FIG. 5 is an image of a pressure vessel used for a liquid leakage seal test.

A test device that would leak a liquid (an oil) by about 0.1 cc per minute was produced by inserting a stainless steel wire having a diameter of 0.5 mm into the packing of the flange portion of the pressure vessel illustrated in FIG. 5 and applying an air pressure of 0.2 MPa to the vessel. A liquid leakage seal test was performed using this test device.

As the oil, a high-pressure insulating oil A obtained from JXTG Energy Corporation (one kind of an insulating oil A compliant with JIS C2320) was used.

The liquid leakage repair material was applied over the liquid-leaked portion from which the liquid was leaking at the liquid leaking speed described above in a manner to sufficiently cover the liquid-leaked portion, and cured by irradiation using a metal halide lamp until the integrated light quantity of 3 J/cm$^2$ at 365 nm. Then, the liquid leaking condition after one hour was visually observed and evaluated according to the evaluation criteria described below.

[Evaluation Criteria]
B: No liquid was leaking.
D: The liquid was leaking.

TABLE 1

|  |  |  | Comp. Ex. 1 | | Ex. 1 | | Ex. 2 | | Ex. 3 | |
| --- | --- | --- | --- | --- | --- | --- | --- | --- | --- | --- |
|  |  |  | part by mass | % by mass | part by mass | % by mass | part by mass | % by mass | part by mass | % by mass |
| Binder | Monofunctional acrylic | ISTA | 95 | 93.14% | 95 | 62.50% | 95 | 47.03% | 95 | 31.46% |
|  |  | IBXA |  |  |  |  |  |  |  |  |
|  |  | 4HBA |  | 0.00% |  | 0.00% |  | 0.00% |  | 0.00% |
|  | Multifunctional acrylic | A-DCP | 5 | 4.90% | 5 | 3.29% | 5 | 2.48% | 5 | 1.66% |
|  | Photo initiator | IRG1173 | 2 | 1.96% | 2 | 1.32% | 2 | 0.99% | 2 | 0.66% |
| Filler | Silica | GS-64 (LV) |  | 0.00% | 50 | 32.89% | 100 | 49.50% | 200 | 66.23% |
|  | Mica | PDM-800 |  | 0.00% |  | 0.00% |  | 0.00% |  | 0.00% |
|  | Talc | MICROACE |  | 0.00% |  | 0.00% |  | 0.00% |  | 0.00% |
| Total |  |  | 102.0 | 100% | 152.0 | 100% | 202.0 | 100% | 302.0 | 100% |
| Viscosity (Pa · s) |  |  |  | 0.02 |  | 0.6 |  | 4.5 |  | 51.9 |
| Stringiness |  |  |  | B |  | B |  | B |  | B |
| Cured product liquid absorption rate (%) |  |  |  | 28.72 |  | 9.01 |  | 7.46 |  | 4.59 |
| Curability | Time to reach (min) |  |  | 0.128 |  | 0.093 |  | 0.091 |  | 0.080 |
|  | Evaluation |  |  | B |  | B |  | B |  | B |
| Shear adhesive strength | MPa |  |  | 0.11 |  | 0.19 |  | 0.26 |  | 0.43 |
|  | Evaluation |  |  | D |  | C |  | B |  | A |
| Liquid leakage seal test |  |  |  | D |  | B |  | B |  | B |

|  |  |  | Ex. 4 | | Ex. 5 | | Comp. Ex. 2 | | Ex. 6 | |
| --- | --- | --- | --- | --- | --- | --- | --- | --- | --- | --- |
|  |  |  | part by mass | % by mass | part by mass | % by mass | part by mass | % by mass | part by mass | % by mass |
| Binder | Monofunctional acrylic | ISTA | 95 | 18.92% | 95 | 7.30% | 95 | 5.93% | 95 | 62.50% |
|  |  | IBXA |  |  |  |  |  |  |  |  |
|  |  | 4HBA |  | 0.00% |  | 0.00% |  | 0.00% |  | 0.00% |
|  | Multifunctional acrylic | A-DCP | 5 | 1.00% | 5 | 0.38% | 5 | 0.31% | 5 | 3.29% |
|  | Photo initiator | IRG1173 | 2 | 0.40% | 2 | 0.15% | 2 | 0.12% | 2 | 1.32% |
| Filler | Silica | GS-64 (LV) | 400 | 79.68% | 1200 | 92.17% | 1500 | 93.63% |  | 0.00% |
|  | Mica | PDM-800 |  | 0.00% |  | 0.00% |  | 0.00% | 50 | 32.89% |
|  | Talc | MICROACE |  | 0.00% |  | 0.00% |  | 0.00% |  | 0.00% |
| Total |  |  | 502.0 | 100% | 1302.0 | 100% | 1602.0 | 100% | 152.0 | 100% |
| Viscosity (Pa · s) |  |  |  | 435 |  | 1,000 |  | — |  | 314 |
| Stringiness |  |  |  | B |  | B |  |  |  | B |
| Cured product liquid absorption rate (%) |  |  |  | 2.21 |  | 0.80 |  |  |  | 6.17 |
| Curability | Time to reach (min) |  |  | 0.055 |  | 0.020 |  |  |  | 0.085 |
|  | Evaluation |  |  | B |  | B |  |  |  | B |
| Shear adhesive strength | MPa |  |  | 0.65 |  | 0.70 |  |  |  | 0.21 |
|  | Evaluation |  |  | A |  | A |  |  |  | B |
| Liquid leakage seal test |  |  |  | B |  | B |  |  |  | B |

|  |  |  | Ex. 7 | | Ex. 8 | | Ex. 9 | | Ex. 10 | |
| --- | --- | --- | --- | --- | --- | --- | --- | --- | --- | --- |
|  |  |  | part by mass | % by mass | part by mass | % by mass | part by mass | % by mass | part by mass | % by mass |
| Binder | Monofunctional acrylic | ISTA | 95 | 47.03% | 95 | 37.70% | 95 | 62.50% | 95 | 37.70% |
|  |  | IBXA |  |  |  |  |  |  |  |  |
|  |  | 4HBA |  | 0.00% |  | 0.00% |  | 0.00% |  | 0.00% |
|  | Multifunctional acrylic | A-DCP | 5 | 2.48% | 5 | 1.98% | 5 | 3.29% | 5 | 1.98% |
|  | Photo initiator | IRG1173 | 2 | 0.99% | 2 | 0.79% | 2 | 1.32% | 2 | 0.79% |

TABLE 1-continued

| | | | | | | | | | | |
|---|---|---|---|---|---|---|---|---|---|---|
| Filler | Silica | GS-64 (LV) | | 0.00% | | 0.00% | | 0.00% | | 0.00% |
| | Mica | PDM-800 | 100 | 49.50% | 150 | 59.52% | | 0.00% | | 0.00% |
| | Talc | MICROACE | | 0.00% | | 0.00% | 50 | 32.89% | 150 | 59.52% |
| Total | | | 202.0 | 100% | 252.0 | 100% | 152.0 | 100% | 252.0 | 100% |
| Viscosity (Pa · s) | | | 337 | | 2,805 | | 522 | | 53,720 | |
| Stringiness | | | B | | B | | B | | B | |
| Cured product liquid absorption rate (%) | | | 4.52 | | 3.19 | | 7.01 | | 4.37 | |
| Curability | Time to reach (min) | | 0.279 | | Initially reached | | 0.114 | | Initially reached | |
| | Evaluation | | B | | A | | B | | A | |
| Shear adhesive strength | MPa | | 0.28 | | 0.40 | | 0.16 | | 0.25 | |
| | Evaluation | | B | | A | | C | | B | |
| Liquid leakage seal test | | | B | | B | | B | | B | |

| | | | Ex. 11 | | Ex. 12 | | Ex. 13 | | Ex. 14 | |
|---|---|---|---|---|---|---|---|---|---|---|
| | | | part by mass | % by mass | part by mass | % by mass | part by mass | % by mass | part by mass | % by mass |
| Binder | Monofunctional acrylic | ISTA | 95 | 37.70% | 95 | 37.70% | 50 | 24.75% | | |
| | | IBXA | | | | | | | 85 | 16.93% |
| | | 4HBA | | 0.00% | | 0.00% | | 0.00% | 10 | 1.99% |
| | Multifunctional acrylic | A-DCP | 5 | 1.98% | 5 | 1.98% | 50 | 24.75% | 5 | 1.00% |
| | Photo initiator | IRG1173 | 2 | 0.79% | 2 | 0.79% | 2 | 0.99% | 2 | 0.40% |
| Filler | Silica | GS-64 (LV) | 100 | 39.68% | 100 | 39.68% | 100 | 49.50% | 400 | 79.68% |
| | Mica | PDM-800 | 50 | 19.84% | | 0.00% | | 0.00% | | 0.00% |
| | Talc | MICROACE | | 0.00% | 50 | 19.84% | | 0.00% | | 0.00% |
| Total | | | 252.0 | 100% | 252.0 | 100% | 202.0 | 100% | 502.0 | 100% |
| Viscosity (Pa · s) | | | 136 | | 1,054 | | 3 | | 240 | |
| Stringiness | | | B | | B | | B | | B | |
| Cured product liquid absorption rate (%) | | | 4.47 | | 4.91 | | 3.20 | | 0.92 | |
| Curability | Time to reach (min) | | 0.122 | | 0.220 | | 0.040 | | 0.038 | |
| | Evaluation | | B | | B | | B | | B | |
| Shear adhesive strength | MPa | | 0.49 | | 0.45 | | 1.50 | | 0.87 | |
| | Evaluation | | A | | A | | A | | A | |
| Liquid leakage seal test | | | B | | B | | B | | B | |

The details of the materials used in Examples and Comparative Examples are as follows.
ISTA: Isostearyl acrylate (obtained from Osaka Organic Chemical Industry Ltd.)
IBXA: Isobornyl acrylate (obtained from Osaka Organic Chemical Industry Ltd.)
4HBA: 4-Hydroxybutyl acrylate (obtained from Osaka Organic Chemical Industry Ltd.)
A-DCP: Tricyclodecanedimethanol diacrylate (obtained from Shin-Nakamura Chemical Co., Ltd.)
IRG1173: 2-Hydroxy-2-methyl-1-phenylpropan-1-one (obtained from BASF GmbH)
Silica: GS-64(LV) (obtained from Tatsumori Ltd., with a median diameter of 5.5 micrometers)
Mica: PDM-800 (obtained from Topy Industries, Limited, with an average particle diameter of 11.2 micrometers)
Talc: MICROACE PA (obtained from Nippon Talc Co., Ltd., with an average particle diameter of 4.5 micrometers)

In Comparative Example 1, the prescription did not contain a filler and the liquid absorption rate (%) of the cured product (after curing) was 10% or higher. Due to these factors, liquid leakage was observed in the liquid leakage seal test.

In Comparative Example 2, the filler content in the prescription was extremely high, and preparation of the repair material was unsuccessful.

The cured products of the liquid leakage repair materials of Examples 1 to 14 had a liquid absorption rate (%) of lower than 10% (after curing). Therefore, the liquid leakage repair materials exhibited a good result in the liquid leakage seal test, and were confirmed to be capable of blocking liquid leakage easily and highly reliably.

Moreover, the inorganic filler content of 20% by mass or greater contributed to improvement of the shear adhesive strength compared with when no inorganic filler was contained (Comparative Example 1).

When Examples 1, 6, and 9 were compared, as an inorganic filler, mica had a great effect of improving the shear adhesive strength.

Example 15

First Embodiment

The liquid leakage repairing method described below was performed using the active-energy-ray-curable composition of Example 10 as the first liquid leakage repair material and the second liquid leakage repair material.

A duct 1 having a liquid-leaked portion 1a (a pinhole with a diameter of 1 mm) as illustrated in FIG. 1A was prepared. The duct 1 was filled with a liquid 2 (a mixture of a high-pressure insulating oil A obtained from JXTG Energy Corporation (one kind of an insulating oil A compliant with JIS C2320) and water at a mass ratio of 1:1), and the liquid 2 in the duct 1 was leaking out from the liquid-leaked portion 1a.

First, the first liquid leakage repair material 3, which was an active-energy-ray-curable composition, was applied by spatula painting in a cylindrical shape [having an outer diameter of 5 mm, an inner diameter of 3 mm, and a height (thickness) of 5 mm] around the liquid-leaked portion 1a of the duct 1 in a manner that the first liquid leakage repair material 3 would not contact the liquid 2 that had leaked out from the liquid-leaked portion 1a (FIG. 1B).

Next, the first liquid leakage repair material 3 was cured by irradiation of active energy rays (a light quantity of 3 J/cm$^2$ at 365 nm) using a UV-LED lamp (365 nm), to obtain a cured product 13 of the first liquid leakage repair material (FIG. 1C). In this way, a liquid reservoir 4 surrounded by the cured product 13 of the first liquid leakage repair material was formed around the liquid-leaked portion 1a.

Next, a base material film 6 (a transparent PET film having a thickness of 50 micrometers) over which the second liquid leakage repair material 5, which was an active-energy-ray-curable composition, was applied with a thickness of 2 mm was placed over the liquid reservoir 4 in a manner that the second liquid leakage repair material 5 would contact the cured product 13 of the first liquid leakage repair material but the second liquid leakage repair material 5 would not contact the liquid 2 that had leaked out from the liquid-leaked portion 1a, to thereby cover the liquid reservoir 4 with the second liquid leakage repair material 5 (FIG. 1D).

Next, the second liquid leakage repair material 5 was cured by irradiation of the second liquid leakage repair material 5 with active energy rays (a light quantity of 3 J/cm$^2$ at 365 nm) through the base material film 6 using a UV-LED lamp (365 nm), to obtain a cured product 15 of the second liquid leakage repair material (FIG. 1E). In this way, the liquid-leaked portion 1a was covered with a cured product of the liquid leakage repair material.

Next, the base material film 6 was peeled (FIG. 1F).

In this way, liquid leakage of the duct was repaired by the liquid leakage repairing method of the first embodiment of the present invention. When curing the liquid leakage repair material, no oil content permeated the liquid leakage repair material. Therefore, the liquid-leaked portion was successfully repaired with a cured product having a stable curability. That is, liquid leakage was successfully prevented with a remarkable ease and with a remarkably high reliability.

Example 16

First Embodiment

Liquid leakage of a duct was repaired by the same operation as in Example 15, except that unlike in Example 15, UV REPAIR PEN GON-FU1 (obtained from Fiberfix Japan), which was an acrylic-based active-energy-ray-curable composition, was used as the first liquid leakage repair material and the second liquid leakage repair material, and the integrated light quantity of active energy rays emitted to the first liquid leakage repair material and the second liquid leakage repair material was changed to 10 J/cm$^2$. Although a greater integrated light quantity than in Example 15 was needed for curing the first liquid leakage repair material and the second liquid leakage repair material, no oil content permeated the liquid leakage repair materials when curing the liquid leakage repair materials. Therefore, the liquid-leaked portion was successfully repaired with cured products having a stable curability. That is, liquid leakage was successfully prevented with easily and highly reliably Example 17

Second Embodiment

The liquid leakage repairing method described below was performed using the active-energy-ray-curable composition of Example 8 as the first liquid leakage repair material, the second liquid leakage repair material, and the third liquid leakage repair material.

First, a duct 1 having a liquid-leaked portion 1a (with a rectangular shape having a width of 1 mm and a length of 5 cm) as illustrated in FIG. 2A was prepared. The duct 1 was filled with a liquid (a mixture of a high-pressure insulating oil A obtained from JXTG Energy Corporation (one kind of an insulating oil A compliant with JIS C2320) and water at a mass ratio of 1:1), and the liquid in the duct 1 was leaking out from the liquid-leaked portion 1a.

First, the first liquid leakage repair material 3, which was an active-energy-ray-curable composition, was applied by spatula painting in a manner to cover a part of the overhead portion of the liquid-leaked portion 1a of the duct 1. The first liquid leakage repair material 3 was cured by irradiation with active energy rays (a light quantity of 3 J/cm$^2$ at 365 nm) using a UV-LED lamp (365 nm). The application and the curing were repeated at another part of the liquid-leaked portion, to shape the liquid-leaked portion to have a size of about 1 mm×1 mm. In this way, the exposed part of the liquid-leaked portion 1a was shrunk with the cured product of the first liquid leakage repair material.

Subsequently, the following steps were performed by the same operation of Example 15 as described with reference to FIG. 1C to FIG. 1F.

The second liquid leakage repair material, which was an active-energy-ray-curable composition, was applied by spatula painting around the exposed part shrunk in a manner that the second liquid leakage repair material would not contact the liquid that had leaked out from the exposed part shrunk.

Next, the second liquid leakage repair material was cured by irradiation with active energy rays, to obtain a cured product of the second liquid leakage repair material. In this way, a liquid reservoir surrounded by the cured product of the second liquid leakage repair material was formed around the exposed part shrunk.

Next, a base material film over which the third liquid leakage repair material, which was an active-energy-ray-curable composition, was applied was placed over the liquid reservoir in a manner that the third liquid leakage repair material would contact the cured product of the second liquid leakage repair material but the third liquid leakage repair material would not contact the liquid that had leaked out from the exposed part shrunk, to thereby cover the liquid reservoir with the third liquid leakage repair material.

Next, the third liquid leakage repair material was cured by irradiation of the third liquid leakage repair material with active energy rays through the base material film, to obtain a cured product of the third liquid leakage repair material. In this way, the exposed part shrunk was successfully covered with the cured product of the liquid leakage repair material.

Next, the base material film was peeled.

In this way, liquid leakage of the duct was repaired by the liquid leakage repairing method of the second embodiment of the present invention. When curing the liquid leakage repair materials, the liquid contacted the liquid leakage repair materials, but the liquid absorption rate of the liquid leakage repair materials was low. Therefore, the liquid-leaked portion was successfully repaired with cured products having a stable curability. That is, liquid leakage was successfully prevented with a remarkable ease and with a remarkably high reliability.

Example 18

Second Embodiment

Liquid leakage of a duct was repaired by the same operation as in Example 17, except that unlike in Example 17, UV REPAIR PEN GON-FU1 (obtained from Fiberfix Japan), which was an acrylic-based active-energy-ray-curable composition, was used as the first liquid leakage repair material, the second liquid leakage repair material, and the third liquid leakage repair material, and the integrated light quantity of active energy rays emitted to the first liquid leakage repair material, the second liquid leakage repair material, and the third liquid leakage repair material was changed to 10 J/cm$^2$. Although a greater integrated light quantity than in Example 17 was needed for curing the first liquid leakage repair material, the second liquid leakage repair material, and the third liquid leakage repair material, the liquid-leaked portion was successfully repaired with cured products having a stable curability. That is, liquid leakage was successfully prevented with ease.

Example 19

Third Embodiment

The liquid leakage repairing method described below was performed using the active-energy-ray-curable composition of Example 5 as the first liquid leakage repair material and the second liquid leakage repair material.

In the following example, a joint portion (flange portion) of a duct 1 was a liquid-leaked portion 1a (FIG. 3A).

First, a light transmissive film 21 (a silicone sheet with a length of 20 cm, a width of 2.5 cm, and a thickness of 2 mm) was prepared. The first liquid leakage repair material 3 was applied over the light transmissive film 21 to have a thickness of about 2 mm (FIG. B). Although the first liquid leakage repair material 3 was applied over the light transmissive film 21, the light transmissive film 21 had an un-applied part 3a (with a size of about 5 mm×5 mm) which was surrounded by the first liquid leakage repair material 3 but over which the first liquid leakage repair material 3 was not applied (FIG. 3C).

Next, the light transmissive film 21 was pasted in a manner to cover the liquid-leaked portion 1a of the duct 1 (FIG. 3D). Then, the first liquid leakage repair material 3 was cured by irradiation with active energy rays (a light quantity of 3 J/cm$^2$ at 365 nm) through the light transmissive film 21 using a UV-LED lamp (365 nm), to obtain a cured product 13 of the first liquid leakage repair material 3.

Next, the light transmissive film 21 was peeled (FIG. 3E). As a result, a liquid reservoir 4 was formed around an exposed part 1c of the liquid-leaked portion 1a, which was a remaining part of the liquid-leaked portion 1a other than one part of the liquid-leaked portion 1a.

Next, the second liquid leakage repair material 5, which was an active-energy-ray-curable composition, was disposed in a manner to cover the liquid reservoir 4 (FIG. 3F).

Next, the second liquid leakage repair material 5 was cured by irradiation of the second liquid leakage repair material 5 with active energy rays (a light quantity of 3 J/cm$^2$ at 365 nm) using a UV-LED lamp (365 nm), to obtain a cured product 15 of the second liquid leakage repair material (FIG. 3G).

In this way, liquid leakage of the duct was repaired by the liquid leakage repairing method of the third embodiment of the present invention. When curing the liquid leakage repair materials, the liquid contacted the liquid leakage repair materials, but the liquid absorption rate of the liquid leakage repair materials was low. Therefore, the liquid-leaked portion was successfully repaired with cured products having a stable curability. That is, liquid leakage was successfully prevented with a remarkable ease and with a remarkably high reliability.

Example 20

Third Embodiment

Liquid leakage of a duct was repaired by the same operation as in Example 19, except that unlike in Example 19, UV REPAIR PEN GON-FU1 (obtained from Fiberfix Japan), which was an acrylic-based active-energy-ray-curable composition, was used as the first liquid leakage repair material and the second liquid leakage repair material, and the integrated light quantity of active energy rays emitted to the first liquid leakage repair material and the second liquid leakage repair material was changed to 10 J/cm$^2$. Although a greater integrated light quantity than in Example 19 was needed for curing the first liquid leakage repair material and the second liquid leakage repair material, the liquid-leaked portion was successfully repaired with cured products having a stable curability. That is, liquid leakage was successfully prevented with ease.

INDUSTRIAL APPLICABILITY

The liquid leakage repair material of the present invention can be suitably used for repairing liquid leakage of a duct, because the liquid leakage repair material can block liquid leakage easily and highly reliably when a liquid leaks out from a duct through which a liquid is circulated.

The liquid leakage repairing method of the present invention can be suitably used for repairing liquid leakage of a duct, because the liquid leakage repairing method can block liquid leakage easily and highly reliably when a liquid leaks out from a duct through which a liquid is circulated.

REFERENCE SIGNS LIST

1: duct
1a: liquid-leaked portion
2: liquid
3: first liquid leakage repair material
4: liquid reservoir
5: second liquid leakage repair material
6: base material film
13: cured product of first liquid leakage repair material
15: cured product of second liquid leakage repair material

The invention claimed is:

1. A liquid leakage repair material, comprising:
   an inorganic filler in an amount of 20% by mass or greater but 95% by mass or less; and
   a curable composition that includes a monofunctional (meth) acrylate represented by General Formula (1) below; a multifunctional (meth) acrylate; and a radical initiator,

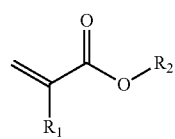

General formula (1)

where in General Formula (1), $R_1$ represents a hydrogen atom or a methyl group, and $R_2$ represents an organic group containing four or more carbon atoms, wherein the target liquid to be prevented from leakage by the liquid leakage repair material is an oil, wherein an oil absorption rate of the liquid leakage repair material after being cured is lower than 10%, as determined by filling the liquid leakage repair material in a mold formed of a silicone resin and having a size of 10 mm ×10 mm and a depth of 5 mm and by covering the surface of the liquid leakage repair material with releasable polyethylene terephthalate (PET) having a thickness of 50 micrometers, and, in this state, by curing the liquid leakage repair material by irradiation using a metal halide lamp until an integrated light quantity of 3 J/cm² at 365 nm, to produce a cured product and by taking the cured product out from the mold and by measuring the weight of the cured product as a weight before liquid absorption and the weight of the cured product being left to stand at 25° C. for 24 hours as a weight after liquid absorption, the oil absorption rate being calculated according to a formula:

oil absorption rate (%)=100×(weight after liquid absorption-weight before liquid absorption)/(weight before liquid absorption).

2. The liquid leakage repair material according to claim 1, wherein the liquid leakage repair material is free of stringiness.

3. The liquid leakage repair material according to claim 1, wherein a viscosity of the liquid leakage repair material is 0.1 Pa's or higher but 100,000 Pa·s or lower.

4. The liquid leakage repair material according to claim 1, wherein the curable composition is an active-energy-ray-curable composition.

5. The liquid leakage repair material according to claim 1, wherein the liquid leakage repair material has a shear adhesive strength of 0.15 MPa or greater.

6. The liquid leakage repair material according to claim 1, wherein when the liquid leakage repair material is cured, a time taken until a storage modulus G' of the liquid leakage repair material reaches 0.07 MPa is 0.50 minutes or shorter.

7. A liquid leakage repairing method, comprising:
applying the liquid leakage repair material according to claim 1, which is an active-energy-ray-curable composition, over a liquid-leaked portion of a duct, and irradiating the liquid leakage repair material with active energy rays to cure the liquid leakage repair material.

8. A duct including a liquid-leaked portion, the duct comprising:
a cured product of the liquid leakage repair material according to claim 1 over the liquid-leaked portion.

* * * * *